US006671805B1

(12) United States Patent
Brown et al.

(10) Patent No.: US 6,671,805 B1
(45) Date of Patent: Dec. 30, 2003

(54) SYSTEM AND METHOD FOR DOCUMENT-DRIVEN PROCESSING OF DIGITALLY-SIGNED ELECTRONIC DOCUMENTS

(75) Inventors: Bruce E. Brown, Orem, UT (US); D. Brent Israelsen, Provo, UT (US)

(73) Assignee: iLumin Corporation, Reston, VA (US)

( * ) Notice: Subject to any disclaimer, the term of this patent is extended or adjusted under 35 U.S.C. 154(b) by 0 days.

(21) Appl. No.: 09/335,443

(22) Filed: Jun. 17, 1999

(51) Int. Cl.[7] .................................................. H04L 9/00

(52) U.S. Cl. ....................... 713/176; 713/170; 713/180; 713/185; 713/200; 713/201

(58) Field of Search ................................ 713/170, 176, 713/180, 182, 185, 189, 200, 201

(56) References Cited

U.S. PATENT DOCUMENTS

| | | | | |
|---|---|---|---|---|
| 5,214,702 A | * | 5/1993 | Fischer | 380/30 |
| 5,390,247 A | | 2/1995 | Fischer | 380/25 |
| 5,448,729 A | | 9/1995 | Murdock | 395/600 |
| 5,606,609 A | | 2/1997 | Houser et al. | 380/4 |
| 5,615,268 A | | 3/1997 | Bisbee et al. | 380/25 |
| 5,659,616 A | * | 8/1997 | Sudia | 705/76 |
| 5,748,738 A | | 5/1998 | Bisbee et al. | 380/25 |
| 5,872,848 A | | 2/1999 | Romney et al. | 380/25 |
| 6,185,683 B1 | | 2/2001 | Ginter et al. | 713/176 |

FOREIGN PATENT DOCUMENTS

| | | | |
|---|---|---|---|
| EP | 0 387 462 A1 | 3/1989 | G06F/15/21 |
| EP | 0 447 341 A2 | 2/1991 | G06F/15/21 |
| WO | WO 98/01807 | 7/1996 | G06F/17/28 |
| WO | WO 98/34167 | 1/1998 | |

OTHER PUBLICATIONS

Donald Eastlake and Joseph Reagle, "XML–Signature WG", Sep. 9, 1999, pp. 1–4.

Brad Hillis, Internet Experiments in Electronic Court Filing, Oct. 6, 1997, chapters 1–6.

Bradley J. Hillis "Electronic Court Filing", Oct. 1, 1997.

Charles R. Merrill, "Toward a Paperless Federal Practice by the Year 2000" , *New Jersey Lawyer Magazine*, 178, 10, Jul./Aug. 1996.

G. Burgess Allison, "Technology Update", *Law Practice Management*, Jul./Aug. 1997.

Utah Administrative Office of the Courts, Information Technology and Information Services, Practitioner's Guide to Electronic Filing in Utah Courts, Jan. 31, 1996, pp. 1–63.

Alan Asay, Applying Information Technology to Court Case Files: Report of the Utah Electronic Filing Project, Sep. 1994I.

(List continued on next page.)

*Primary Examiner*—Thomas R. Peeso
(74) *Attorney, Agent, or Firm*—Vernon W. Francissen; Gardner Carton & Douglas LLP

(57) ABSTRACT

A computer-implemented method for digitally signing an electronic document by a plurality of signers includes determining a signing role of each signer; identifying a to-be-signed portion of the document corresponding to the signing role of each signer; receiving an indication from each signer to digitally sign the document; and applying the digital signature of each signer to the corresponding to-be-signed portion in response to the indication from each signer. A computer-implemented method for processing electronic documents includes receiving a document at a document processing station; reading a processing instruction from a processing portion of the document; identifying a processing service within the document processing station for executing the processing instruction; executing the processing instruction at the document processing station using the identified processing service; and applying a digital signature of the document processing station to the document after the processing is executed.

12 Claims, 18 Drawing Sheets

OTHER PUBLICATIONS

The Third Branch, "Electronic Filing System Brings Order to Mountain of Documents", Feb. 1996.

Alan M. Gahtan, "E–Filing of Court Documents a Big Hit", Dec. 9, 1996.

Suzanne H. James, "Electronic Filing", *Court Technology Bulletin*, May/Jun. 1996, vol. 8, No. 3.

Chief Justice, Extract from the Honourable the Chief Justices' Response at the Opening of the Legal Year 1997, $4^{th}$ Jan. 1997.

Battle, S.A., Johnson, R. B., "Flexible Information Presentation With XML," IEE Colloquim Multimedia Databases and MPEG–7, GB, IEE, London, XP–002128574, pp. 13/1–13/6, 1998.

* cited by examiner

SYSTEM AND METHOD FOR DOCUMENT-DRIVEN PROCESSING OF DIGITALLY-SIGNED ELECTRONIC DOCUMENTS

BACKGROUND OF THE INVENTION

1. Field of the Invention

The present invention relates generally to electronic documents, and more particularly, to a system and method for document-driven processing of digitally-signed, electronic documents.

2. Identification of Copyright

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

DESCRIPTION OF THE BACKGROUND ART

E-commerce is rapidly becoming the watchword for businesses in the next millennium. The appeal of a completely paperless transaction is obvious—reduced storage costs; instant global access to transaction data; and the merging, filtering, and mining of data. Not only will businesses benefit from paperless transactions, but also a number of other institutions, such as courts and government agencies.

A few problems need to be addressed, however, before widespread acceptance of paperless transactions is possible. First, there is a need for a system that provides a high degree of trust in electronic documents. In other words, there is a need for a system that authenticates and prevents the repudiation of electronic documents. Second, there is a need for a flexible, efficient, and auditable system for creating and processing trusted electronic documents.

The problem of establishing trust in electronic information is largely cultural. Despite the widespread use of computers, the United States still very much a paper-based society. Many eople tend to trust paper documents, while distrusting the same information stored in a computer. Similarly, many people tend to respect such traditional indicia of authenticity and non-repudiation as handwritten signatures, official seals, and the like. As a result, while growing numbers of people are willing to buy books, flowers, or Furbies™ over the Internet, they are not willing to use the same medium to buy a car, a house, or a company.

Only recently has the technical and legal framework been established for providing the same kind of trust in electronic documents. The technical framework has emerged as a result of recent advances in cryptography, such as public key cryptography and digital signatures. The legal framework has developed through such legislative reform as the Utah Digital Signature Act, which was the first legislative initiative to give clear legal recognition to digital signatures.

As noted above, the key technical framework for establishing trust in electronic information is cryptography, i.e. the science of protecting information by transforming it into an unreadable format by means of a mathematical formula. There are two basic types of cryptography—symmetric and asymmetric. In symmetric key cryptography, both the sender and receiver of a message use the same secret key, i.e. a number or code used for scrambling or unscrambling information. The sender uses the secret key to encrypt the message and the receiver uses the same secret key to decrypt the message.

The difficulty arises, however, when the sender and receiver attempt to agree on, the secret key without anyone else finding out. For example, if the sender and receiver are in separate physical locations, they must trust a courier, a telephone system, or some other transmission medium to prevent the disclosure of, the secret key. Anyone who overhears or intercepts the key in transit can later read, modify, and forge all messages encrypted or authenticated with that key. Thus, symmetric key encryption systems present a difficult problem of key management.

The other type of cryptography, assymetric or "public key" cryptography, was developed as a solution to the key management problem. In public key cryptography, two keys are used—a public key and a private key. The user publishes his public key to the world, while keeping the corresponding private key secret. Although the public and private keys are mathematically related, neither can be feasibly derived from the other.

To send a private message using public key cryptography, a message is encrypted using the recipient's public key, which is freely available, and is decrypted by the recipient using his private key, which only he knows. Thus, the need for the sender and recipient to share secret information is eliminated. A sender only needs to know the recipient's public key, and no private keys are ever transmitted or shared.

Public key cryptography offers another crucial advantage over symmetric key cryptography—a framework for creating digital signatures. One of the significant problems with cryptographic communications is determining whether an encrypted message was forged (i.e. falsely attributed to another person) or tampered with during transmission. As noted above, if a symmetric key is lost or stolen, any person in possession of the key can forge messages or modify legitimate messages.

Using public key cryptography, however, a sender can digitally "sign" a message using the sender's private key. This process involves calculating a message digest, i.e. a number that represents a summary of the entire message, and encrypting the message digest with the sender's private key. The message digest is calculated using a one-way hash function such that any change to the message will result in a different calculated message digest. While it would be possible to encrypt the entire message, it would typically be too expensive in terms of time and computing resources. Consequently, for non-private communications, encrypting just the message digest is preferable.

When the message is received, the recipient uses the sender's known public key to decrypt the message digest, thereby proving that the message was not forged, since only the sender could have encrypted the message digest with the corresponding private key. Thereafter, the recipient calculates a new message digest for the message and compares it with the original message digest. If the digests match, the message was not tampered with during transmission.

In the legal and commercial contexts, a digital signature can fulfill the same requirements of identity authentication and non-repudiation as a handwritten signature. First, the digital signature may be used to identify the sender of a message. Second, because only the sender knows his private key, it is impossible for the sender to repudiate a document signed using his private key. This fact makes it possible for digitally-signed agreements to become legally binding. In addition, unlike a handwritten signature, a digital signature can protect the integrity of the document by indicating whether the document was modified since it was signed.

Even with the availability of digital signature technology, a second problem that needs to be addressed in order to ensure widespread acceptance of paperless transactions is the development of a flexible, efficient, and auditable system for creating and processing trusted electronic documents. Unfortunately, conventional approaches have numerous drawbacks.

For example, a traditional model for creating and processing electronic information is as follows:

Paper Document→Sign→Courier→File Clerk→DBMS.

In other words, a paper document is signed and then sent by a courier, such as UPS, to a file clerk. The file clerk inputs various data from the paper document into a Database Management System (DBMS), which allows the data to be processed and displayed for a variety of purposes.

Unfortunately, such a model has several drawbacks. First, it is not very flexible. Once a typical DBMS schema is created, it is difficult to update or modify in order to accommodate the changing needs of its users. Moreover, each client computer that accesses the DBMS must be programmed with the same database schema and use compatible database software. This requires a high degree of uniformity and compatibility among the components of the system.

A second problem with the model is that it is not very efficient. For example, the essential elements of the paper document must be re-entered by the file clerk, resulting in duplication of effort. Moreover, sending the paper document via the courier requires significant time and expense. In addition, human file clerks are prone to typographical errors, making the resulting database untrustworthy. Consequently, for important documents, it is necessary to retain the paper original for future verification, resulting in increased storage costs.

A third problem with the model is that it is difficult to audit. In other words, it is difficult to track who has accessed or modified the electronic information. Most database systems do not track every access and modification to the stored data. Even if such tracking were available, however, it would be extremely difficult to incorporate digital signature technology into the system. The data entered from the original paper document is distributed throughout various tables in the DBMS, making it infeasible to digitally "sign" a complete document.

A second conventional model for creating and processing electronic information is as follows:

Paper document→Sign→Fax →File Clerk→DBMS.

This model is only slightly better than its predecessor because the courier is replaced by a facsimile machine. However, a facsimile transmission often distorts the image of the paper document, making it difficult to read by the file clerk and thereby increasing the chance of transcription errors. Additionally, the digitization process often makes verification of signatures difficult.

A third, more recent, model for creating and processing electronic information is as follows:

PDF/WP document→Digitally Sign→E-mail→File Clerk→DBMS.

In other words, a PDF (Adobe Systems® format) or word processing document is digitally signed using, for example, a public key cryptosystem. Thereafter, the document is sent by e-mail to the file clerk who inputs various data from the document into the DBMS.

This model is superior to the facsimile approach for a number of reasons. First, the document may be legibly printed or viewed by the file clerk, increasing the reliability of transcription. Additionally, the digital signature prevents modification of the document during transmission. Moreover, the PDF or word processing document may be directly stored within the DBMS, eliminating the need for retaining the paper original.

Despite these advantages, the file clerk may still make typographical errors, resulting in the information being incorrectly stored or indexed. Moreover, there is still the problem of inefficiency. The file clerk must retype essential data contained within the document, resulting in duplication of effort.

A fourth, more recent, model for creating and processing electronic information is as follows:

PDF/WP→Digitally Sign+EDI Header→E-mail→EDI→DBMS.

In this model, the PDF or word processing documents is digitally signed and then appended to an Electronic Data Interchange (EDI) header. EDI is a common standard used for transferring data between different companies using networks, such as the Internet. ANSI has approved a set of EDI standards known as the X12 standards.

EDI is advantageous because it eliminates the need for the filing clerk. The EDI process automatically reads the EDI header and inputs relevant data directly into the DBMS. Additionally, the document may be automatically stored in the database for future reference or verification.

Nevertheless, this model still has many of the disadvantages of its predecessors. For example, the model is still not very efficient. The EDI header duplicates much of the information that is contained within the document. This "double coding" of information wastes storage space and can result in a document being misfiled if the EDI header information is incorrect.

Additionally, the model is still not very flexible. Typical EDI systems are hard-coded at both the client and server level to communicate with a particular DBMS. Thus, there is still the problem of upgradeability and the requirement for substantially uniform and compatible system components. Additionally, these systems are typically limited to displaying the entire document or nothing. This is a disadvantage when the document contains both public and private information, as in court documents and the like. People with a valid interest in the public data are typically barred from access by conventional systems in order to preserve the privacy of the private data.

There are also significant problems with incorporating digital signatures into EDI-based systems. Although a digital signature could be attached to the entire PDF or word processing document, it would typically be impossible to attach digital signatures to different portions of the document, such as where different people need to sign in different locations. Also, there are no defined mechanisms in EDI for auditing the modifications to, and the digital signing of, electronic documents.

Accordingly, what is needed is a system and method for providing a high degree of trust in electronic documents. What is also needed is a flexible, efficient, and auditable system and method for creating and processing trusted electronic documents. What is additionally needed is a digital signature system and method in which different people can digitally sign different portions of the electronic document. Moreover, what is needed is a digital signature system and method in which each person can sign the document in a particular role or capacity, each role or capacity corresponding to a specified portion of the electronic document. In addition, what is needed is an electronic document format including delimiters for indicating portions of the document to be signed by a person in a particular role or capacity. What is also needed is a system and method for specifying order in which the document is to be signed by a plurality of signers. Moreover, what is needed is a document-driven system and method for processing electronic documents encoded with processing instructions. What is additionally needed is an electronic document format including processing instructions for indicating how the document is to be processed. What is needed is a document processing system including a plurality of processing services for executing the processing instructions.

SUMMARY OF THE INVENTION

The present invention solves the foregoing problems by providing a system and method for document-driven processing of digitally-signed, electronic documents. One aspect of the invention is a computer-implemented method for digitally signing an electronic document by a plurality of signers, wherein each signer has a signing role and a unique private key for applying a digital signature, each signing role corresponds to a to-be-signed portion of the document, and at least two signing roles correspond to different to-be-signed portions. The method includes the steps of determining the signing role of each signer; identifying the to-be-signed portion of the document corresponding to the signing role of each signer; receiving an indication from each signer to digitally sign the document; and applying the digital signature of each signer to the corresponding to-be-signed portion in response to the indication from each signer.

In another aspect of the invention, the document includes a signing order for is indicating an order in which the document is to be signed by the plurality of signers, the method including the steps of determining a signing role of a signer; determining whether the signer is signing in the indicated order; when the signer is signing in the indicated order, identifying the to-be-signed portion of the document corresponding to the role of the signer, receiving an indication from the signer to digitally sign the document, and applying the digital signature of the signer to the corresponding to-be-signed portion.

Yet another aspect of the invention is a computer-implemented method for processing electronic documents, wherein each document comprises a data portion and a processing portion, the processing portion comprising at least one processing instruction. The method includes the steps of receiving a document at a document processing station, the document processing station having a unique private key for applying a digital signature to the document; reading a processing instruction from the processing portion of the document; identifying a processing service within the document processing station for executing the processing instruction; executing the processing instruction at the document processing station using the identified processing service; and applying the digital signature of the document processing station to the document after the processing instruction is executed.

Still another aspect of the invention is a computer-implemented method for processing electronic documents in the context of a plurality of document processing stations, wherein each document comprises a data portion and a processing portion, the processing portion comprises at least one processing instruction, and each document processing station has a unique private key for applying a digital signature. The method includes the steps of receiving a document at a first document processing station; reading a processing instruction from the processing portion of the document; identifying a processing service for executing the processing instruction; determining whether the identified service is available within the first document processing station; in response to the identified service not being available within the first document processing station, locating a second document processing station in which the identified service is available; sending the document to the second document processing station; executing the processing instruction at the second document processing station using the identified processing service; and applying the digital signature of the second document processing station to the document after the processing instruction is executed.

Another aspect of the invention is a system for digitally signing an electronic document by a plurality of signers, wherein each signer has a signing role and a unique private key for applying a digital signature, each signing role corresponds to a to-be-signed portion of the document, and at least two signing roles corresponds to different to-be-signed portions. The system comprises a signing role identifier for identifying the signing role of each signer; a parser, coupled to the signing role identifier, for parsing the document to identify the to-be-signed portion of the document corresponding to the signing role of each signer; and a signing module, coupled to the parser, for applying the digital signature of each signer to the corresponding to-be-signed portion in response to receiving an indication to sign from each signer.

In yet another aspect of the invention, a system for processing electronic documents includes at least one document processing station, each document processing station comprising a computer-readable medium for storing an electronic document, the document comprising a data portion and a processing portion, the processing portion comprising at least one processing instruction; a parser, coupled to the computer-readable medium, for reading a processing instruction from the processing portion of the document and identifying a processing service for executing the processing instruction; at least one processing service, coupled to the parser, for executing the processing instruction; and an signing module, coupled to the processing service, for applying the digital signature of the document processing station to the document after the processing instruction is executed.

BRIEF DESCRIPTION OF THE DRAWINGS

These and other more detailed and specific objects and features of the present invention are more fully disclosed in the following specification, reference being had to the accompanying drawings, in which.

Figure 3:
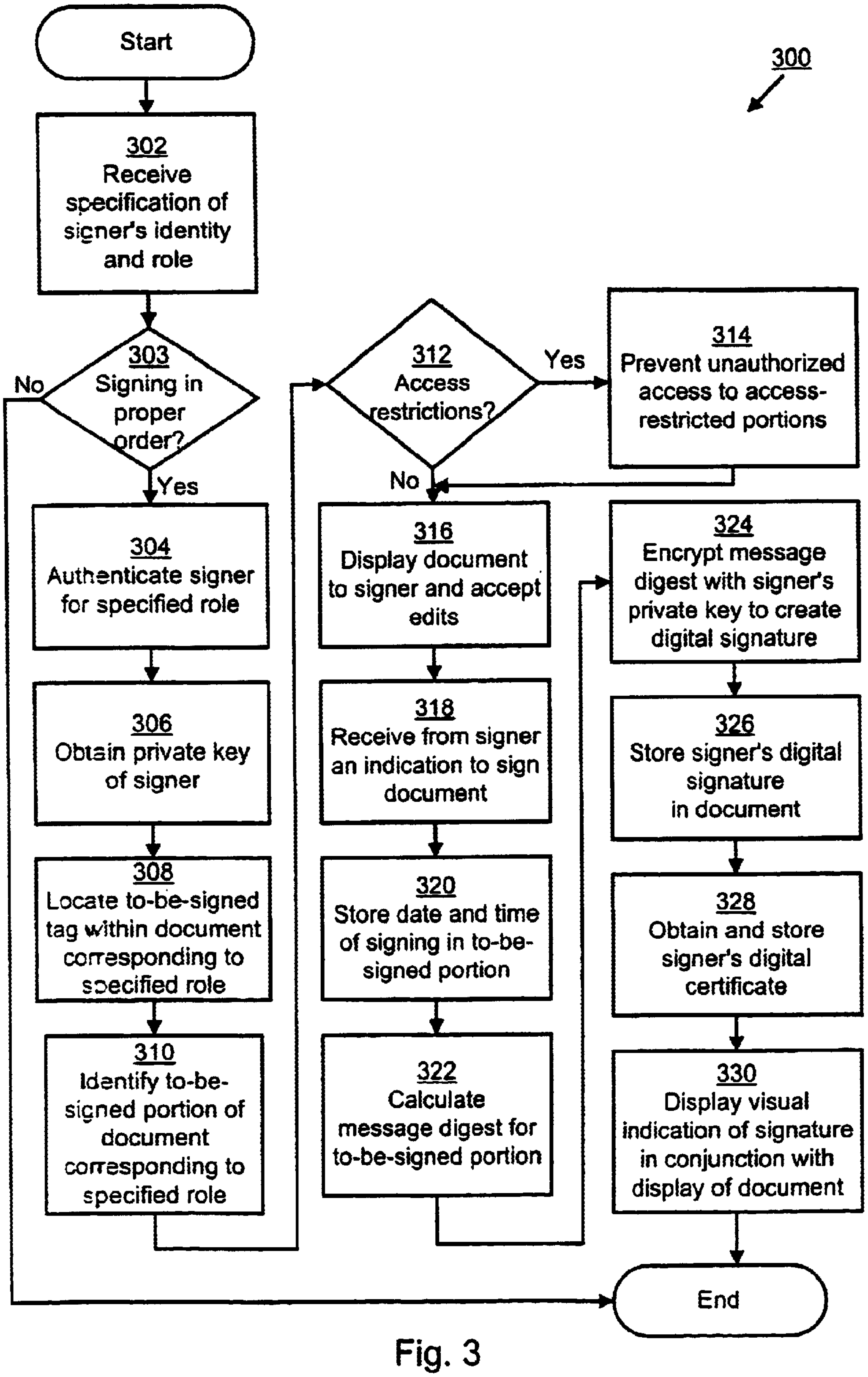
Figure 5:
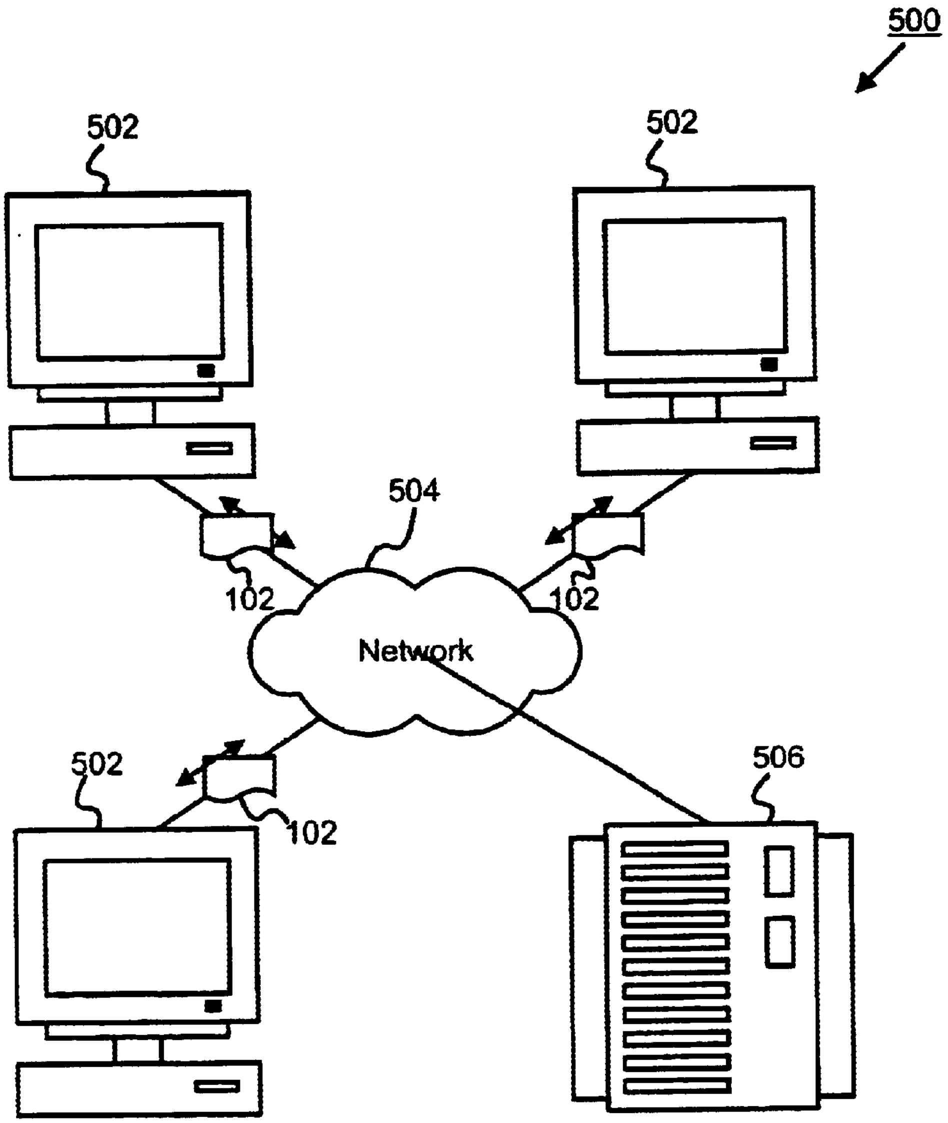
Figure 6:
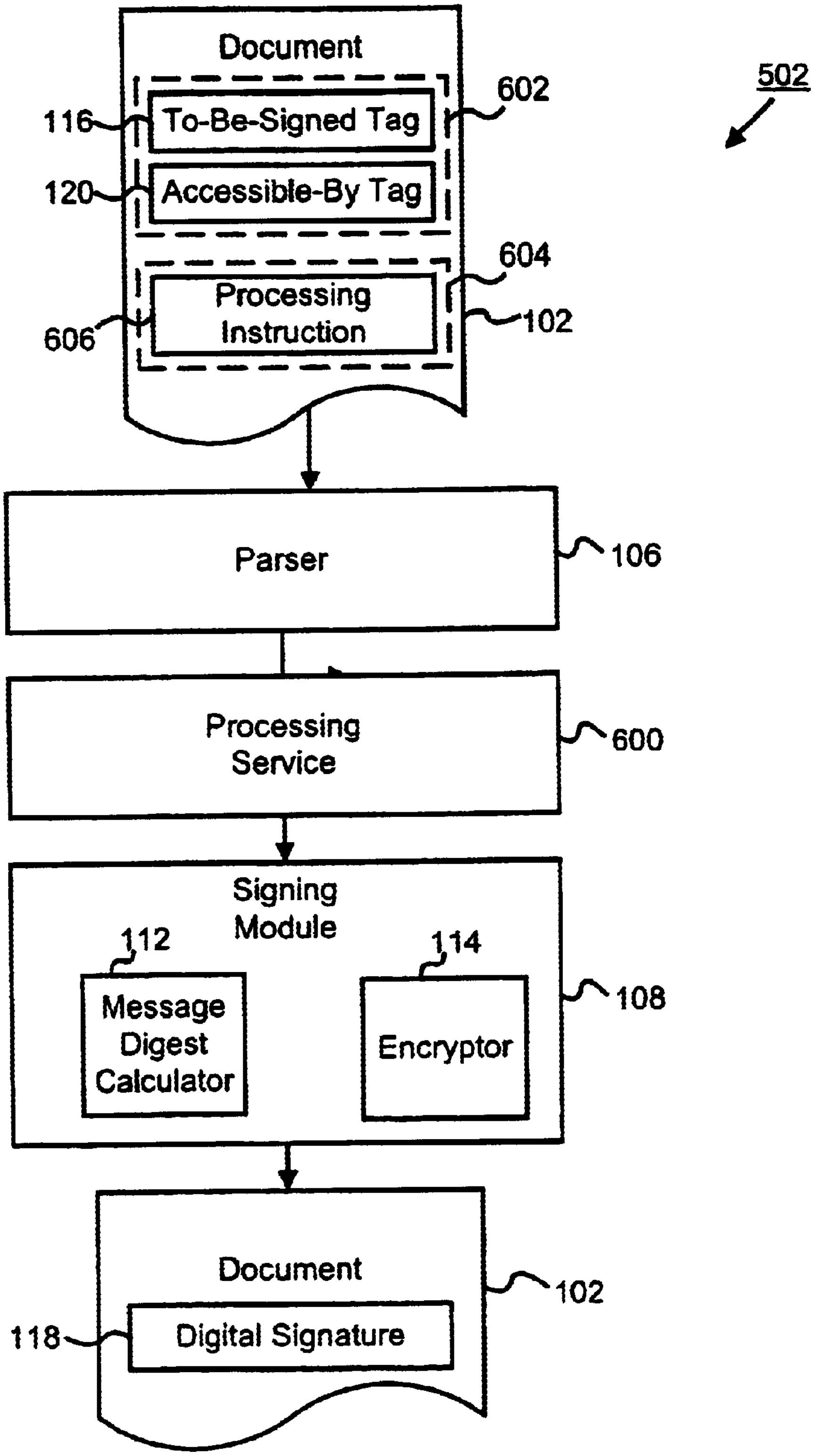
Figure 7:
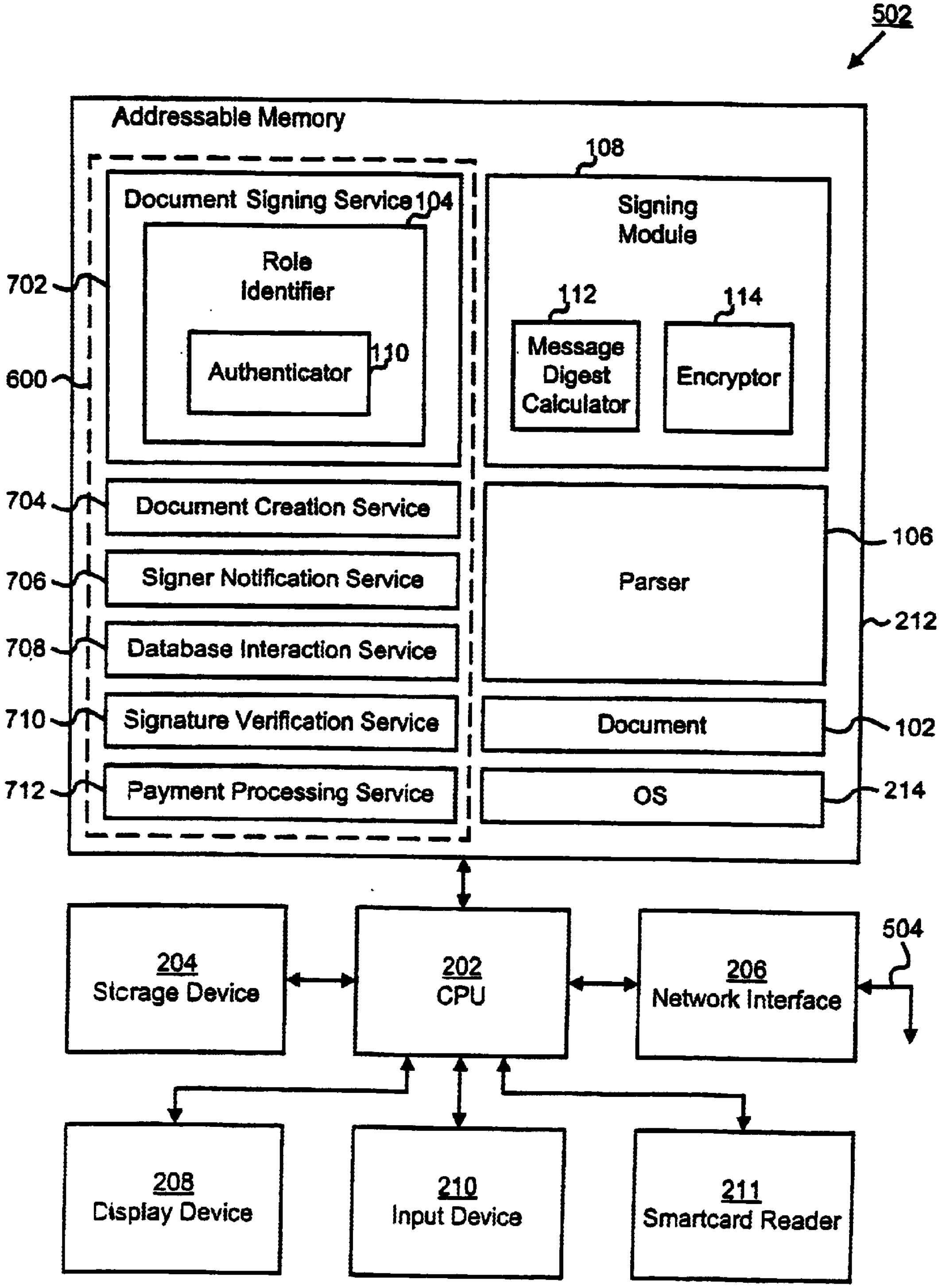
Figure 8A:
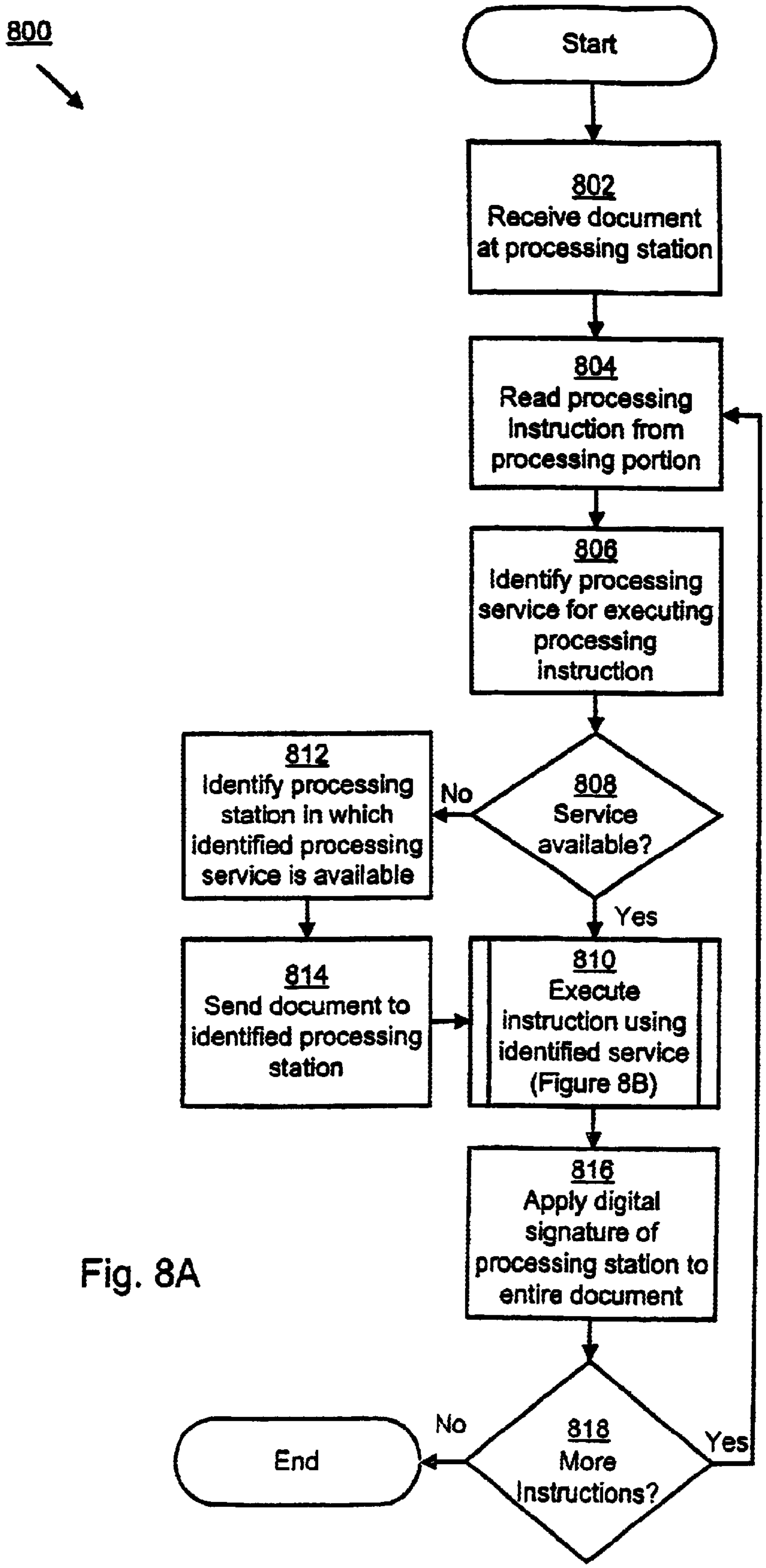
Figure 8B:
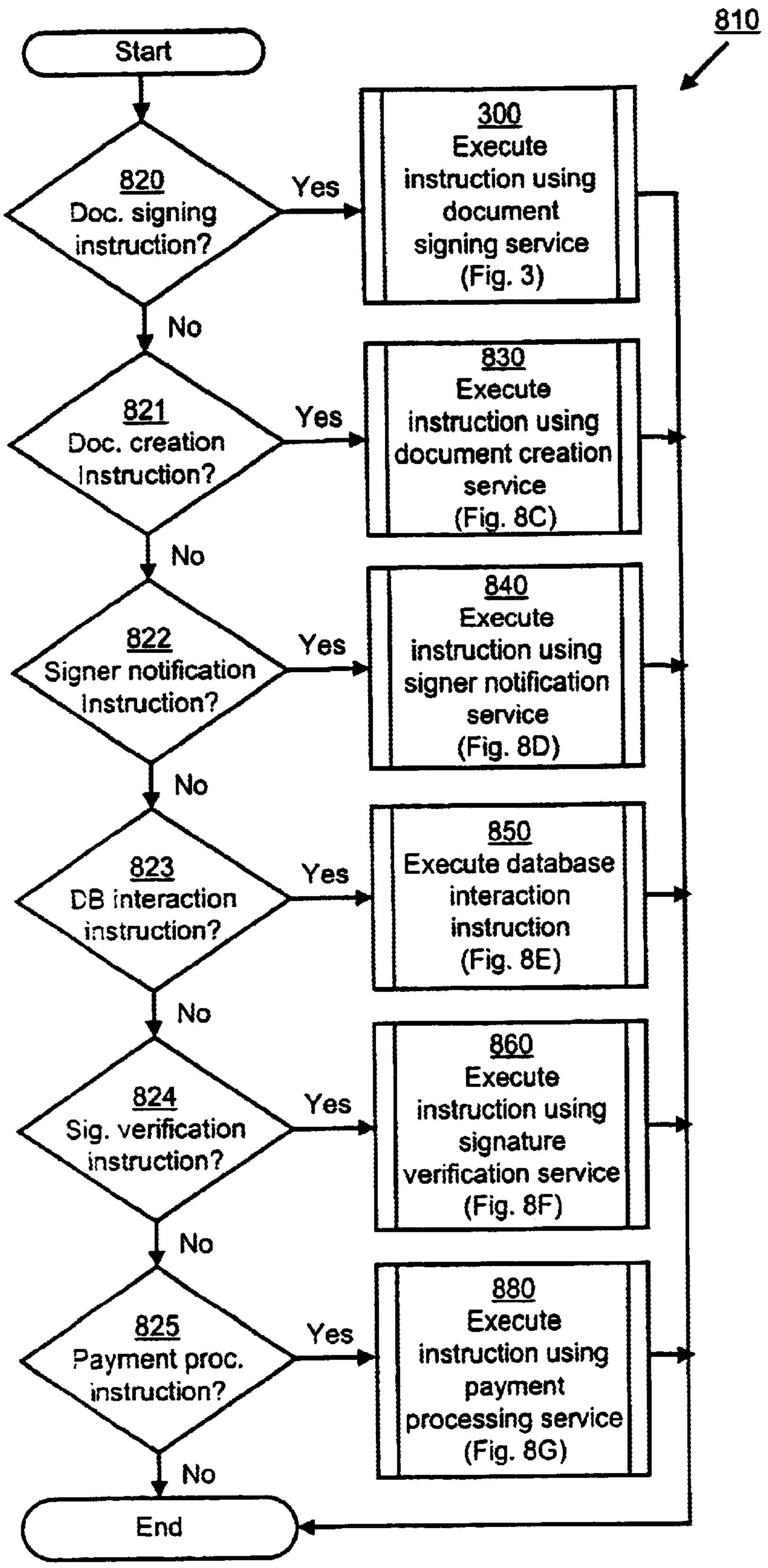
Figure 8C:
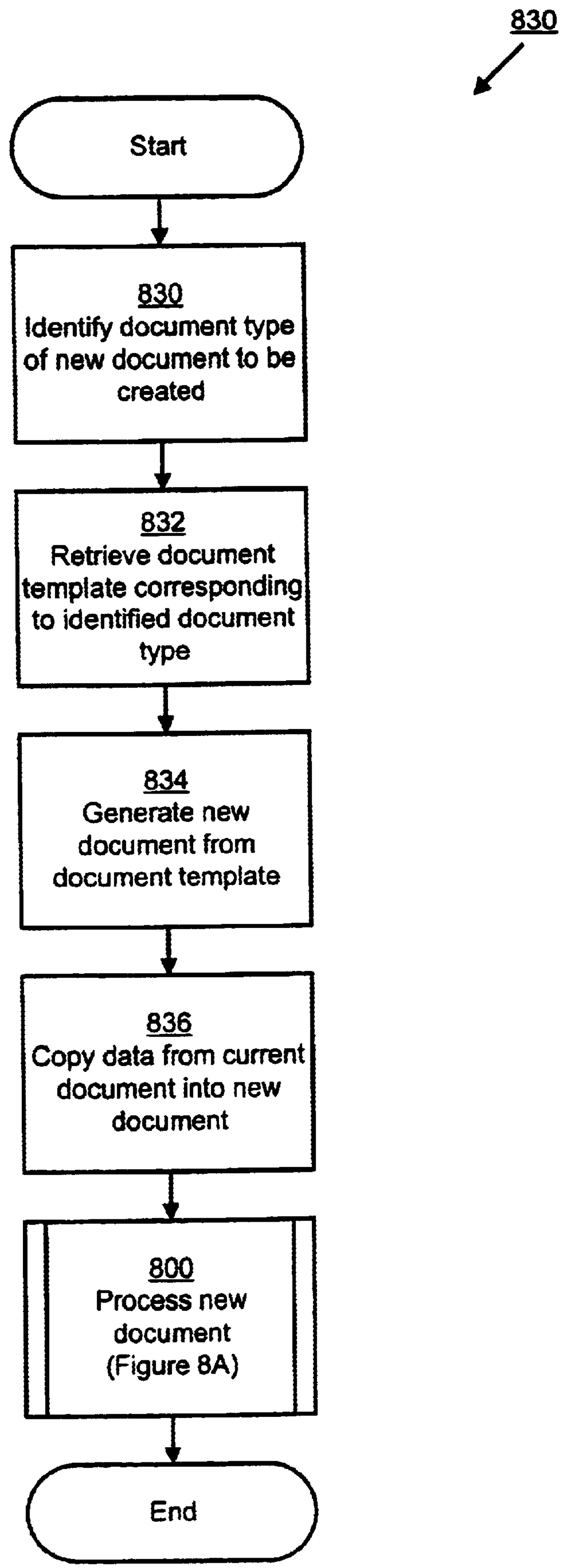
Figure 8D:
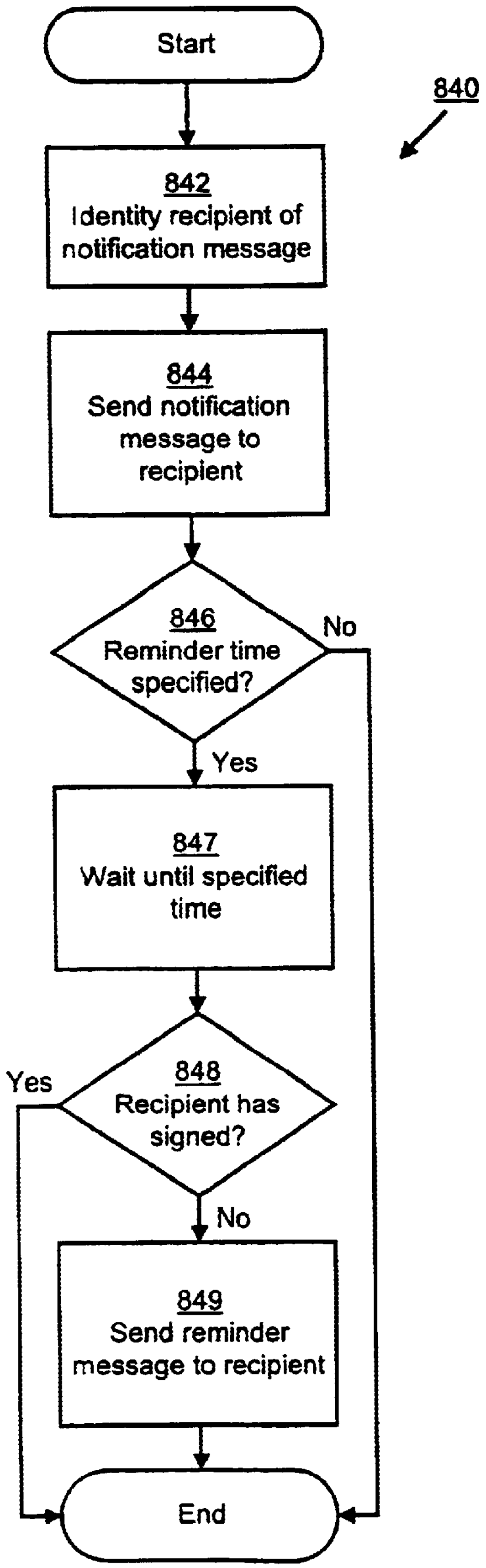
Figure 8E:
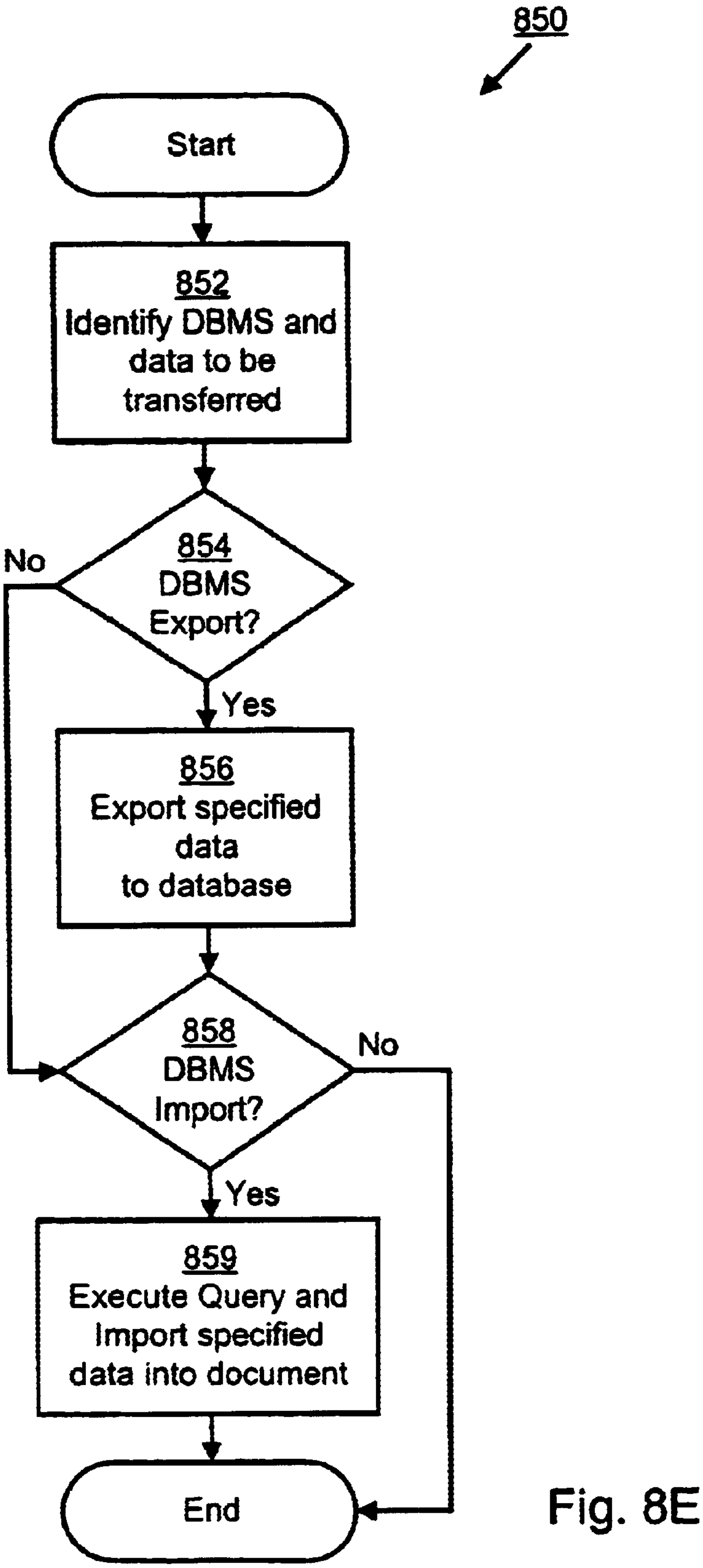
Figure 8F:
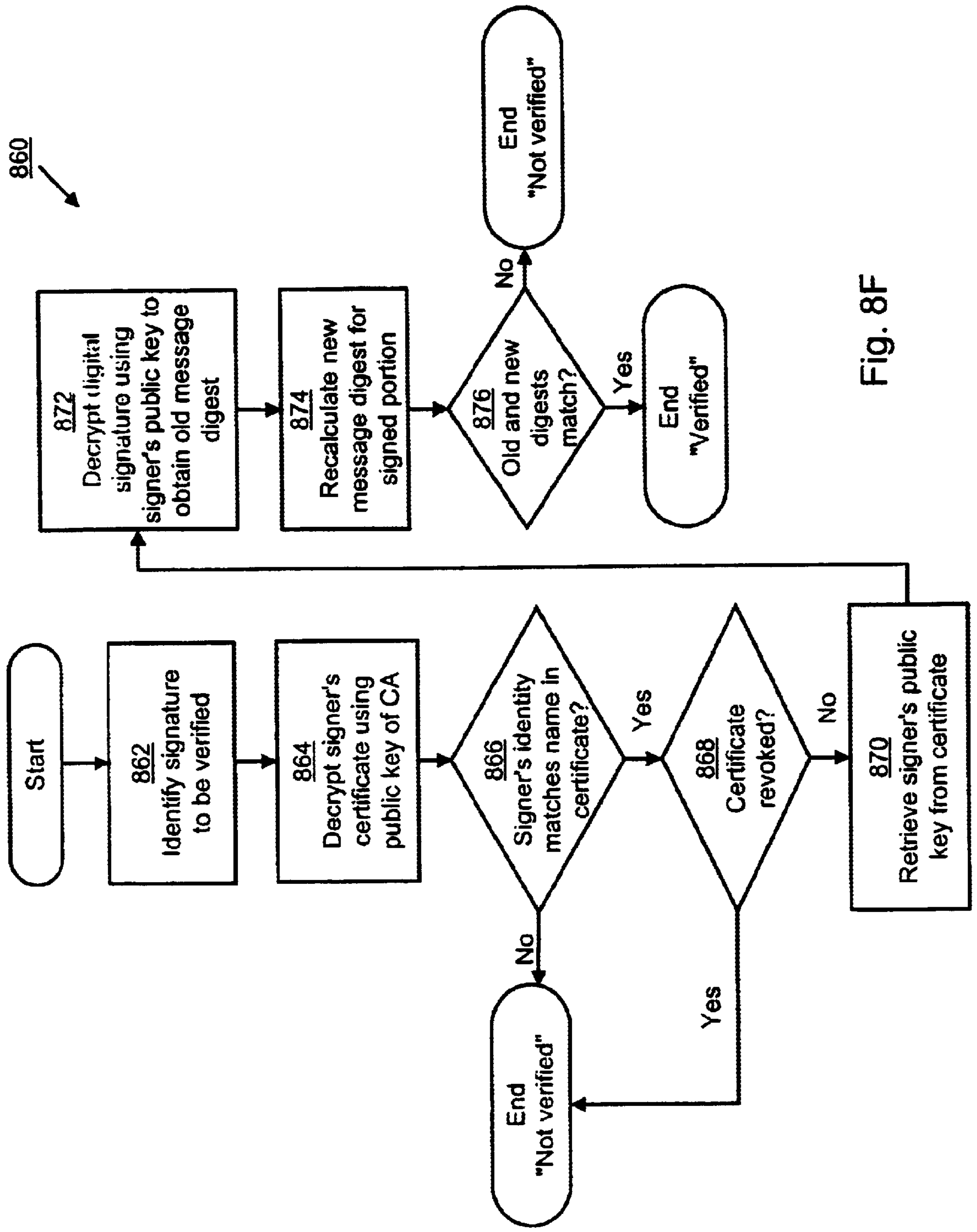
Figure 8G:
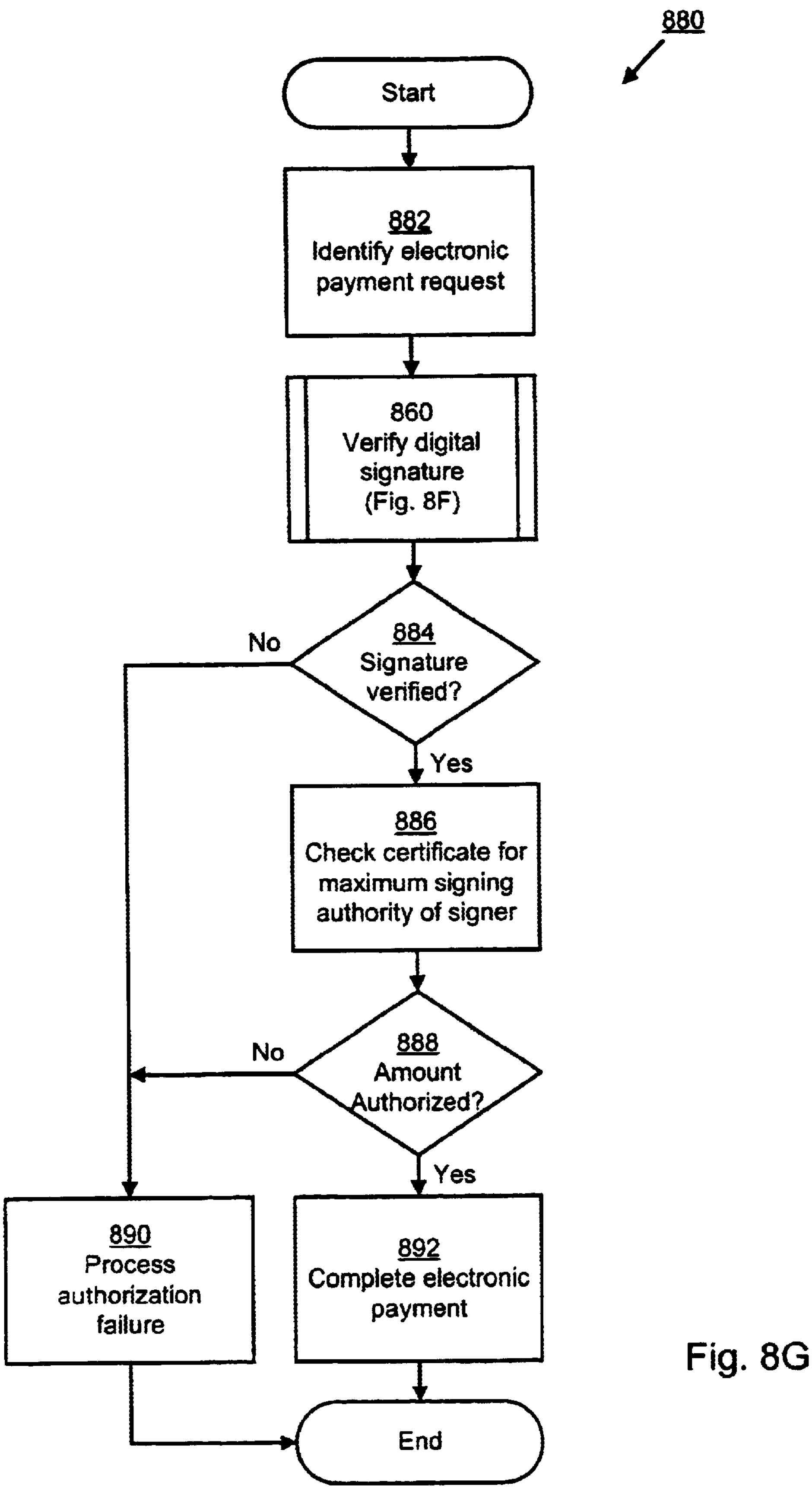

FIG, 2 is a physical block diagram of a system for digitally signing an electronic document according to one embodiment Of the present invention;

FIG. 3 is a flowchart of a method for digitally signing an electronic document according to one embodiment of the present invention;

FIGS. 4A–4E are screenshots taken from system for digitally signing an electronic document according to one embodiment of the present invention;

FIG. 5 is a system diagram of a document processing system according to one embodiment of the present invention;

FIG. 6 is a functional block diagram of a document processing station according to one embodiment of the present invention;

FIG. 7 is a physical block diagram of a document processing station according to one embodiment of the present invention;

FIG. 8A is a flowchart of a method for processing electronic documents 102 according to an embodiment of the present invention;

FIG. 8B is a flowchart of a method for executing a processing instruction 606 according to one embodiment of the invention;

FIG. 8C is a flowchart of a method performed by a document creation service according to one embodiment of the invention;

FIG 8D is a flowchart of a method performed by a signer notification service according to one embodiment of the invention;

FIG. 8E is a flowchart of a method performed by a database interaction service according to one embodiment of the invention;

FIG. 8F is a flowchart of a method performed by a signature verification service according to one embodiment of the invention; and FIG. 8G is a flowchart of a method performed by a payment processing service according to one embodiment of the invention.

DETAILED DESCRIPTION OF THE PREFERRED EMBODIMENTS

A preferred embodiment of the invention is now described with reference to the Figures, where like reference numbers indicate identical or functionally similar elements. Also in the Figures, the left most digit of each reference number corresponds to the Figure in which the reference number is first used.

Figure 1:
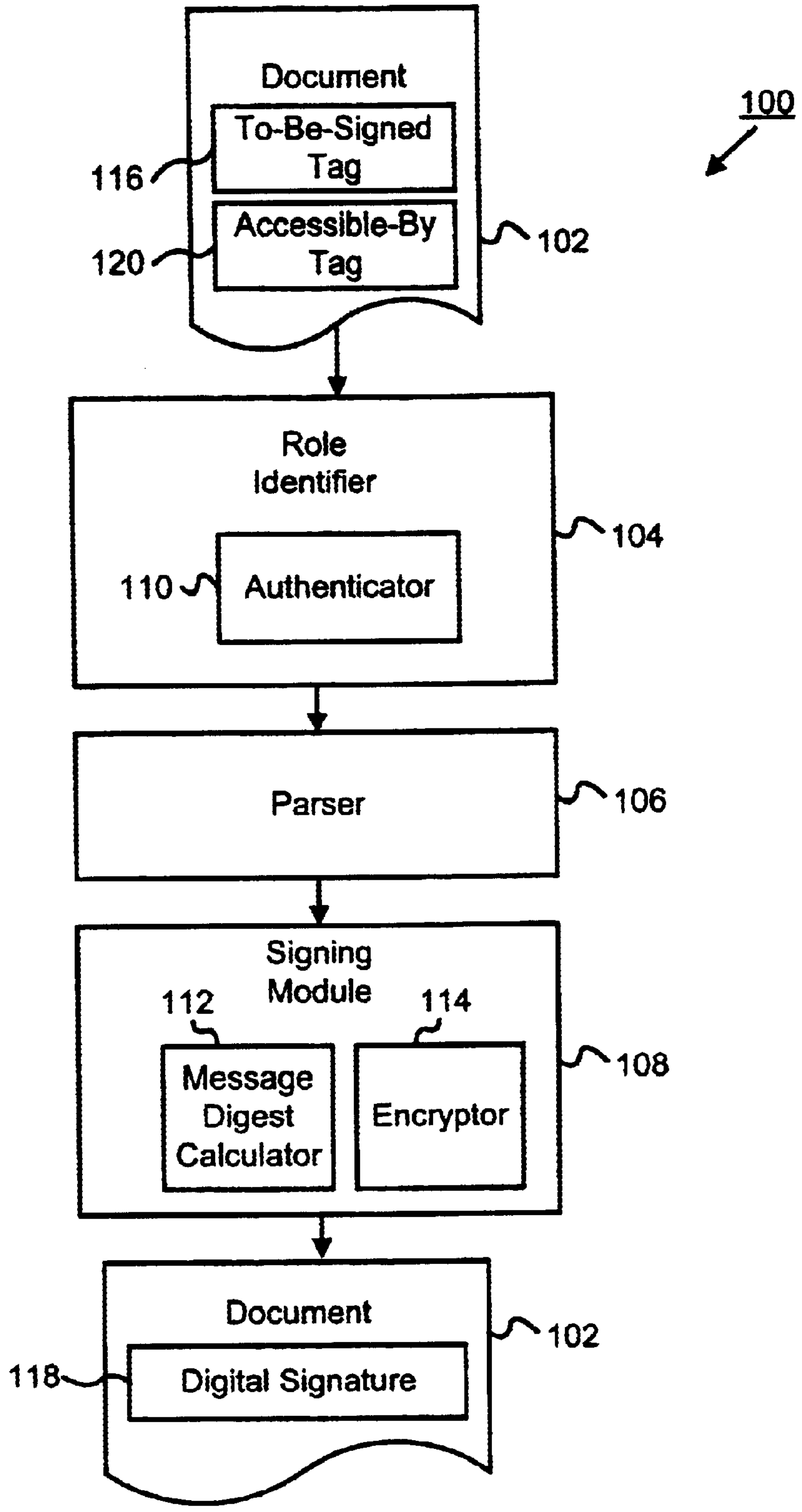
FIG. 1 is a functional block diagram of a system for digitally signing an electronic document according to one embodiment of the present invention.

Referring now to FIG. 1, there is shown a functional block diagram of a system 100 for digitally signing electronic documents 102 according to one embodiment of the present invention. As described hereafter, each document 102 is preferably encoded using a markup language, such as the extensible markup language (XML), although the invention is not limited in that respect. For example, the standard generalized markup language (SGML, ISO 8879) or another markup language could be used without departing from the spirit of the invention. Preferably, the document 102 is indexed for full text searching, and the document data within tagged fields are indexed for field searches. The indexing allows a user to easily perform document queries using techniques well known to those skilled in the art.

The document 102 could represent any of a number of legal or commercial instruments, such as sales contracts, licenses, non-disclosure agreements, patent applications, court pleadings, mortgages, and the like. Appendices A and B are examples of a document type definition (DTD) and a document 102, respectively, in the context of an electronic court filing system. However, it should be recognized that a wide variety of applications may be provided within the scope of the present invention.

Briefly, the principal components of the system 100 include a role identifier 104, a parser 106, and a signing module 108. In one embodiment, the foregoing components are implemented as software modules running on a conventional personal computer, such as an IBM PC™ compatible, although other implementations are possible. For example, the components could be distributed among a plurality of computers within a network. Alternatively, the components could be implemented as hardware devices within an embedded system. Although the components are described herein as separate functional units, those skilled in the art will recognize that various components may be combined or integrated into a single software application or device.

The role identifier 104 determines the role or capacity in which a signer is to digitally sign the electronic document 102. Unlike conventional systems which are limited to the signing of an entire document by a single person in a single role or capacity, the present invention allows multiple individuals to sign different portions of the document 102 in multiple different roles or capacities. Thus, the present invention enables the signing of complex, real-world documents.

In one embodiment, the role identifier 104 is implemented as a Web browser, such as the Microsoft Internet Explorer, available from Microsoft Corporation of Redmond Washington. Preferably, the role identifier 104 receives input from the signer to determine the signer's identity and/or role. As discussed in greater detail below, the input is obtained using conventional input mechanisms such as pull down menus, radio buttons, text entry boxes, and the like.

In one embodiment, the role identifier 104 includes an authenticator 110, which is used to authenticate the signer's identity, as well as the signer's authorization to sign the document 102 in the specified role. Although a variety of authentication systems exist, a public key cryptosystem is preferably used to authenticate the signer, as described hereafter. In one embodiment, the authenticator 110 is implemented as a "plug-in" module to a conventional Web browser. Although the authenticator 110 is illustrated herein as a component of the role identifier 104, it should be recognized that the authenticator 110 could be implemented as a separate functional unit.

Coupled to the role identifier 104, the parser 106 parses the document 102 to identify the portion to be signed by the signer, i.e. the "to-be-signed" portion. In one embodiment, the parser 106 is an XML parser adapted to parse an XML-encoded document 102. As described in greater detail below, the parser 106 identifies within the document 102 a "to-be-signed" tag 116 or other delimiter for indicating a portion of the document 102 to be signed by the signer in the specified role or capacity. The document 102 may include a plurality of such tags 116 corresponding to the plurality of signers and roles. In addition, the parser 106 may be used to identify one or more "accessible-by" tags 120 within the document 120, as described in greater detail hereafter.

In a preferred embodiment, XML is used because it may be parsed using a relatively simple parser 106. However, as noted above, SGML or another markup language could be used without departing from the spirit of the invention. In one embodiment, the parser 106 is a commercially-available XML parser, such as the XML parser available from Microsoft Corporation. However, a custom-designed parser 106 could also be used within the scope of the present invention.

Coupled to the parser 106, the signing module 108 applies the signer's digital signature to the identified to-be-signed portion of the document 102. In one embodiment, the signing module 108 applies the digital signature using the RSA Public Key Cryptosystern, available from RSA Data Security, Inc. of San Mateo, Calif., although the invention is not limited in that respect. The RSA Public Key Cryptosystem is well known to those skilled in the art, and has become a de facto standard for cryptographic communications and digital signatures. In a preferred embodiment, the signing module 108 is implemented as a "plug-in" module to a standard Web browser, although other implementations are possible without departing from the spirit of the invention.

In one embodiment, the signing module 108 includes a message digest calculator 112 for calculating a message digest for the to-be-signed portion. As noted above, the message digest is a number or code that represents the to-be-signed portion of the document 102. Preferably, the message digest is calculated using a one-way hash function, such as the Secure Hash Algorithm (SHA) or MD5, whereby any change to the message will result in a different calculated message digest. SHA was developed by NIST as specified in the SHS(Secure Hash Standard). The algorithm take a message (less than $2^{64}$ bits of length) and produce a 160 bit message digest. MD5 was developed by RSA and takes a message of arbitrary length and produce a 128 bit message digest. A description and source code for MD5 can be found within RFCs 1319–1321. Although the message digest calculator 112 is illustrated herein as a component of the signing module 108, it should be recognized that the calculator 112 could be implemented as a separate functional unit.

The signing module 108 also includes an encryptor 114 for encrypting the message digest with the signer's private key. The encrypted message digest is referred to herein as a digital signature 118. In one embodiment, the digital signature 118 is stored within the document 102 and associated with the portion of the document 102 that was signed. Although the encryptor 114 is illustrated herein as a component of the signing module 108, it should be recognized that the encryptor 114 could be implemented as a separate functional unit.

Figure 2:
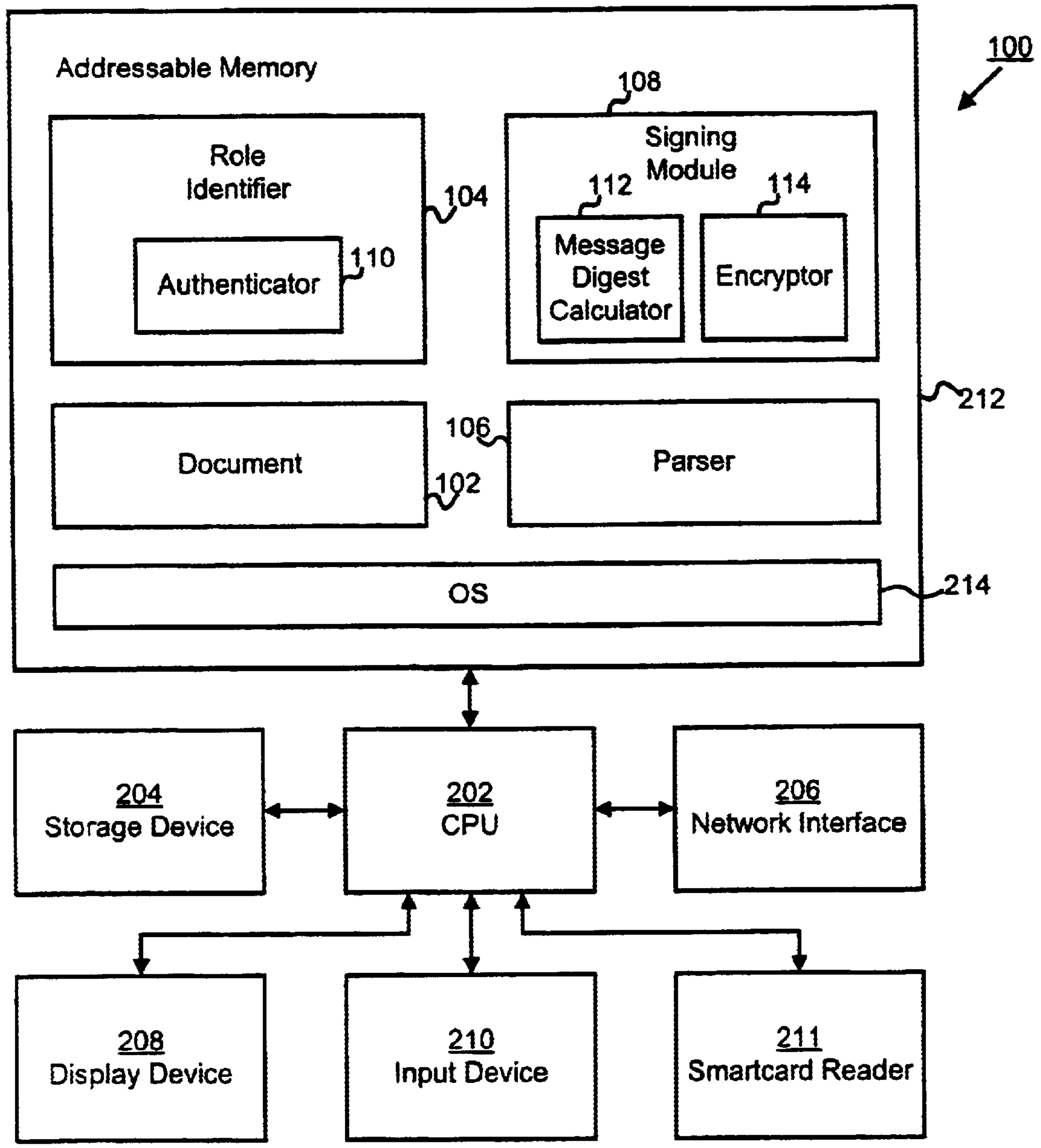

Referring now to FIG. 2, there is shown a physical block diagram showing the components used to implement the functionality of FIG. 1. A central processing unit (CPU) 202 executes software instructions and interacts with other system components to perform the methods of the present invention. A storage device 204, coupled to the CPU 202, provides long-term storage of data and software programs, and may be implemented as a hard disk drive or other suitable mass storage device. In one embodiment, the storage device 204 stores a plurality of documents 102 to be signed.

A network interface 206, coupled to the CPU 202, connects the system 100 to a network (not shown), such as the Internet. A display device 208, coupled to the CPU 202, displays text and graphics under the control of the CPU 202. An input device 210, coupled to the CPU 202, such as a mouse or keyboard, facilities user control of the system 100. A smartcard reader 211, coupled to the CPU 202, facilitates access to a smartcard for authentication purposes, as described in greater detail below.

An addressable memory 212, coupled to the CPU 202, stores software instructions to be executed by the CPU 202, and is implemented using a combination of standard memory devices, such as random access memory (RAM) and read-only memory (ROM) devices. In one embodiment, the memory 212 stores the above-described document 102 and software modules, including the role identifier 104, parser 106, signing module 108, authenticator 110, message digest calculator 112, and encryptor 114.

In one embodiment, the memory 212 also includes an operating system 214 for managing and providing system resources to the above-mentioned software modules. Preferably, Windows 98, available from Microsoft Corporation, is used, although a variety of other operating systems 228, such as Windows NT, MacOS 8, and UNIX, may be used within the scope of the present invention Referring now to FIG. 3, there is shown a flowchart of a method 300 for digitally signing an electronic document 102 according to one embodiment of the present invention. The method begins by receiving 302 a specification of the signer's identity and role. As noted earlier, the role identifier 104 is used in one embodiment to receive input from the signer. Preferably, the role identifier 104 uses conventional input mechanisms such as pull-down menus, radio buttons, or text entry boxes to receive the specified identity and role.

Figure 4A:
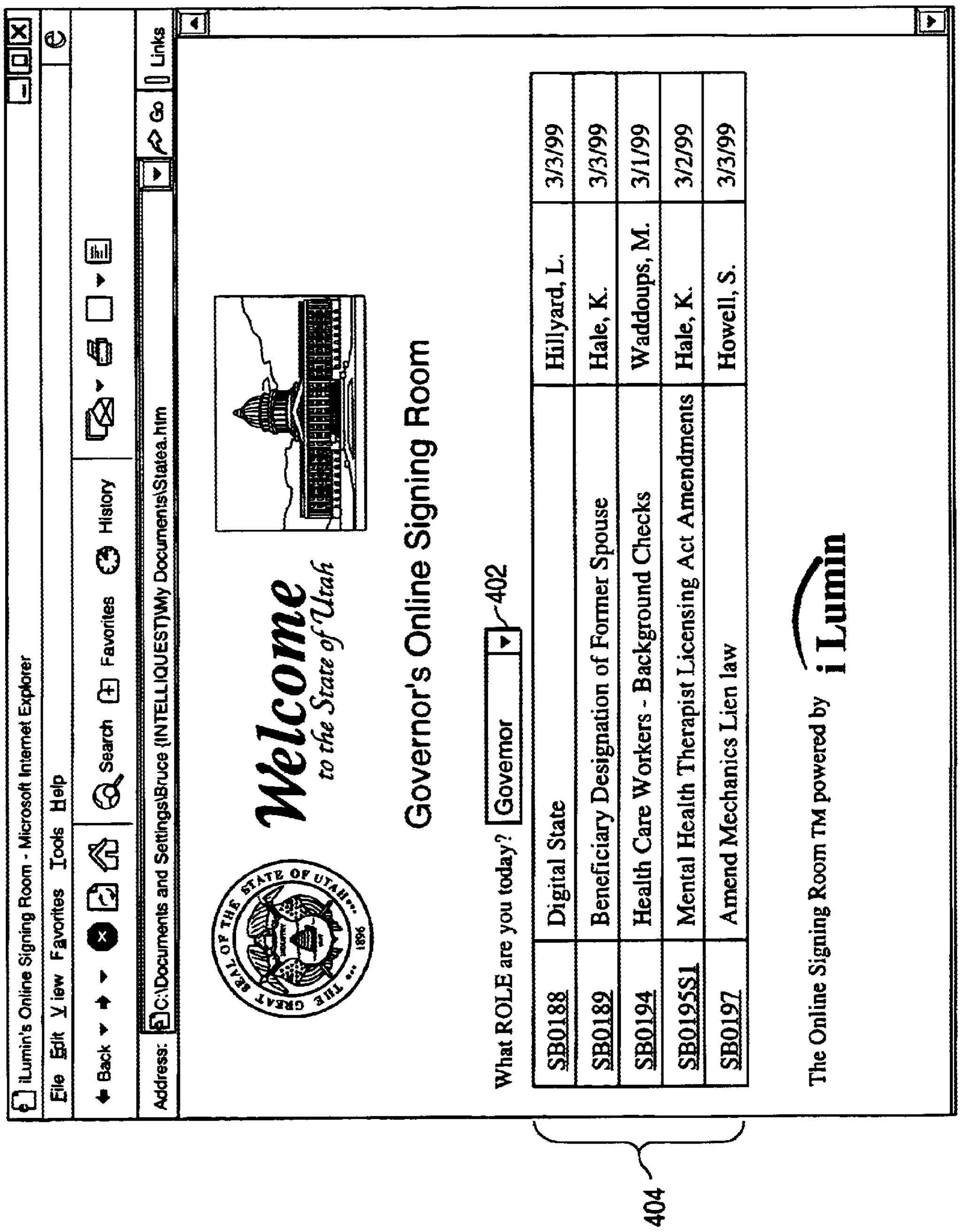

For example, in one embodiment, as illustrated in FIG. 4A, the signer's role is specified by means of a pull-down menu 402. In this example, only the role is required because the identity of the signer is apparent from the role. Likewise, in certain embodiments, the identity of the signer may be obtained from a "cookie" or from network login information. However, it should be recognized that the signer's identity could be separately specified.

Figure 4B:
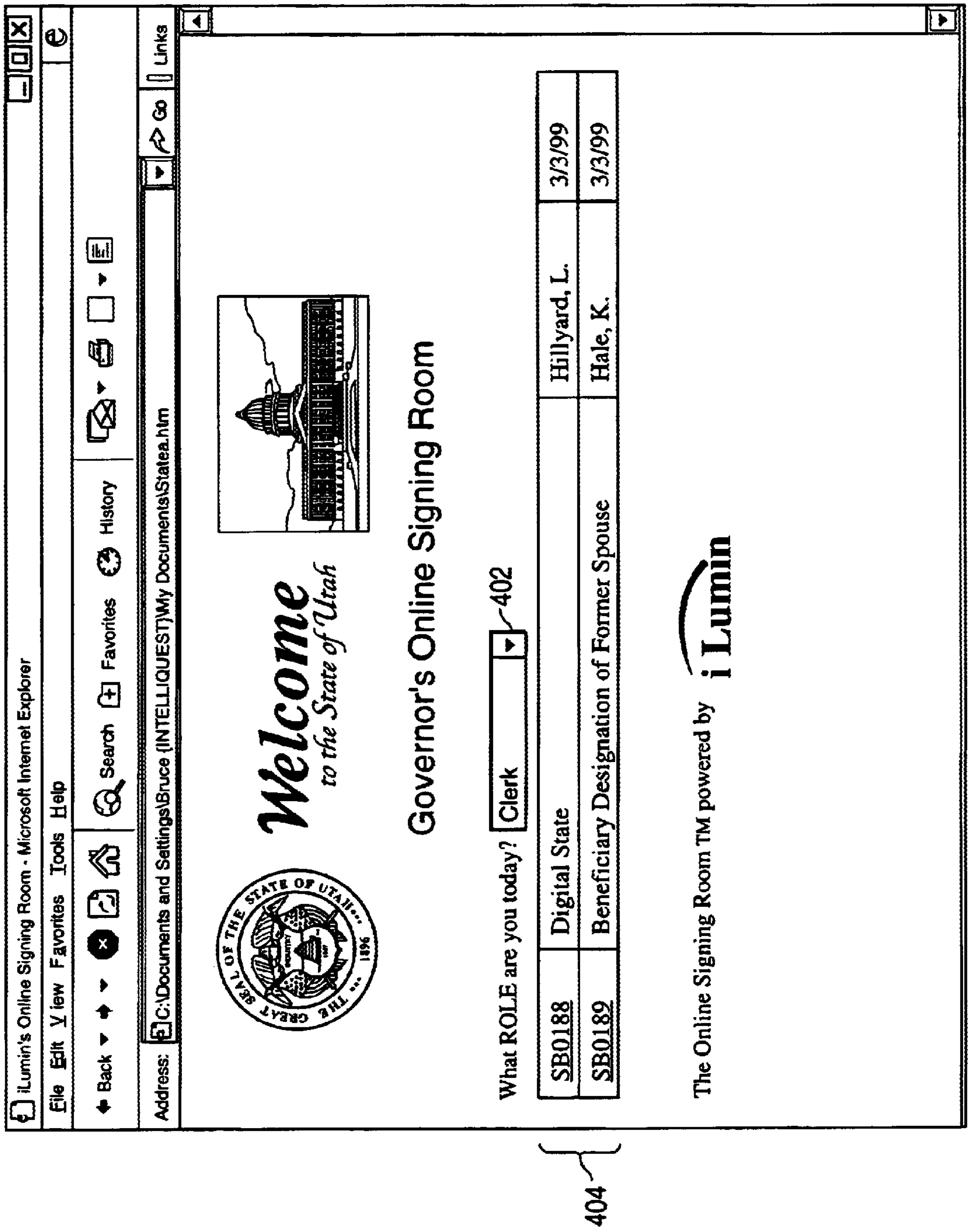
Figure 4C:
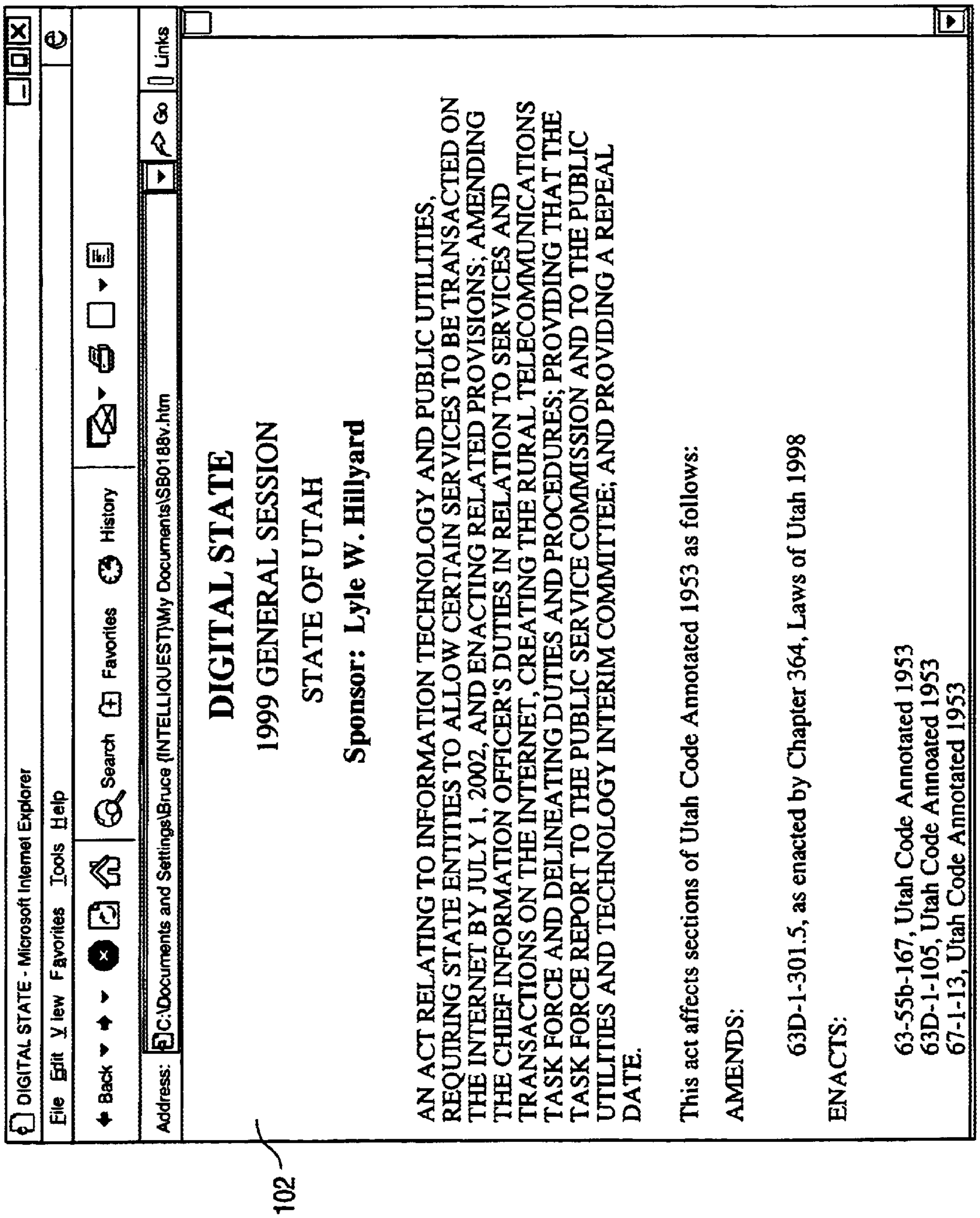

Preferably, the role identifier 104 displays a list 404 of possible documents 102 to be signed by the signer. For example, as shown in FIG. 4A, the selection of the role of "Governor" from the pull-down menu 402 results in a list 404 of bills to be signed by the Governor. Likewise, as shown in FIG. 4B, the selection of "Clerk" from the menu 402 results in a list 404 of bills to be reviewed and approved by the Clerk.

The list 404 may be generated in a number of ways. For example, as described more fully hereafter, the parser 106 may parse a plurality of documents 102 (located either in the storage device 204 or in memory 212) to identify each to-be-signed tag 116 contained therein. As noted earlier, each to-be-signed tag 116 indicates a role of a signer. Thus, an index (not shown) of documents 102 and roles may be created, which may then be used by the role identifier 104 to generate a list 404 of documents 102 for a specific role.

After the specification of the identity and role of the signer is received, the method continues by determining 302 whether the signer is attempting to sign in the proper order relative to the other signers of the document 102. It is advantageous in many instances for a document 102 to be signed in a particular order. For example, in some commercial contracts, it is necessary for the seller to sign the document before the buyer. As a result, the document 102 may contain a signing order, preferably in the form of an ordered sequence of signing roles. For example, a signing order has the following format according to one embodiment:

<Signingorder>
<Signer order=1><PersInfo Role="Buyer"></Signer>
<Signer order=2><PersInfo Role="Seller"></Signer>
</SigningOrder>.

It should be recognized, however, that a signing order specification is optional. Thus, if no signing order is specified, the method automatically continues with step 304. If, however, there is a specified signing order and the signer is attempting to sign out-of-order, the method is complete; otherwise, the method continues with step 304.

In step 304, the method continues by authenticating 304 the signer for the specified role. In other words, the identity of the signer is verified by the authenticator 110 before the signer is allowed to sign the document 102 in the specified role or capacity. For a digital signature to have at least the reliability of a handwritten signature, it is important to authenticate the signer. For example, if a person who is not the Governor attempts to specify the Governor's role in FIG. 4A, the system 100 should detect and prevent the unauthorized access.

A variety of techniques may be used to authenticate the signer. However, public key cryptography offers a particularly secure method for authentication. For example, in one embodiment, the signer inserts a smartcard encoded with her private key into the smartcard reader 211. Smartcards and smartcard readers 211 are available from a variety of sources, such as Micromodular Data Solutions of Santa Clara, Calif.

The authenticator 110 uses the private key encoded within the smartcard to encrypt a standard message. Thereafter, the authenticator 110 attempts to decrypt the message using the signer's public key, which may be obtained from public key database or the like using a standard protocol, such as the Lightweight Directory Access Protocol (LDAP). If the message is successfully decrypted, the smartcard is known to contain the private key of the authorized signer.

For even greater security, the smartcard may contain previously-acquired biometric data of the signer, such as digitized fingerprints, voiceprints, facial configurations, iris images, and the like, which may be compared with new biometric data obtained at the time of authentication using a biometric data acquisition device (not shown). Biometric data acquisition devices are well known in the art and may be obtained from a variety of sources. For example, fingerprint identification systems may be obtained from Digital Persona, of Redwood City, Calif. Likewise, SAFlink Corp., of Tampa, Fla. provides a system for voice, face and fingerprint recognition. IriScan, Inc. of Marlton, N.J. provides a system for iris scanning.

If the previously-acquired data substantially matches the new biometric data (within standard tolerances for noise and other effects), the signer will be declared authentic. In combination with the public key authentication system discussed above, the foregoing technique makes the signer's digital signature far more reliable and difficult to repudiate than its handwritten equivalent.

In alternative embodiments requiring a lesser degree of security, the signer may provide a pass phrase or the like to the role identifier 104, after which the pass phrase is compared against a database of pass phrases for various signing roles. If a match is found, the signer is authorized for the corresponding role.

After the signer is authenticated, the method continues by obtaining 306 the private key of the signer. As noted earlier, the private key is important because it is used for generating the signer's digital signature 118. In the smartcard embodiment described above, the signer's private key is simply retrieved from the smartcard. Various security measures, well known to those skilled in the art, may be used to prevent unauthorized access to and retrieval of the signer's private key. In the case of the pass phrase embodiment, a private key is preferably stored within the database for each pass phrase. When a match is found, the corresponding private key is retrieved from the database.

After the private key is obtained, the method continues by locating 308 a to-be-signed tag 116 within the document 102 corresponding to the specified role of the signer. As explained above, the to-be-signed tag 116 is an XML tag used for indicating a portion of the document 102 to be signed. In an alternative embodiment, an XML attribute is used for the same purpose. The parser 106 parses the document 102 to find the to-be-signed tag 116 corresponding to the specified role. If the parser 106 is unable to find the tag 116, an error is preferably generated.

Thereafter, the to-be-signed tag 116 is used to identify 310 the to-be-signed portion of the document corresponding to the role of the signer. In one embodiment, each to-be-signed tag 116 comprises a beginning tag (comprising an identification of a role) and an end tag. For example, a to-be-signed tag 116 has the following form in one embodiment:

<TBSigned SigID="Governor">

. . .

</TBSigned>

The text between the beginning tag and end tag comprises the to-be-signed portion of the document 102. The use of to-be-signed tags 116 is highly advantageous because it allows various portions of a document 102 to be signed by different individuals, unlike conventional systems which are limited to signing an entire document by a single individual.

After the to-be-signed portion is identified, a check 312 is made whether any portion of the document 102 is access restricted, or, in other words, whether any portion of the document 102 should not be displayed to, or modified by the signer. The ability to restrict the viewing and/or modification of particular portions of a document 102 is advantageous in many contexts. For example, an electronically-filed court document might include portions that are sealed by a court order. Nevertheless, the unsealed portions should still be available to be viewed by the public. Likewise, certain agreements include portions that are not relevant, and thus should not be viewed or modified, by a particular signer. Thus, in one embodiment, access restrictions may be placed on the document 102 in order to allow the signer to view and/or modify certain portions and not others. This is an advance over conventional systems in which a digitally-signed word processing or PDF-encoded document must be displayed to the signer in its entirety or not at all.

As described above, the document 102 may include one or more accessible-by tags 120 for indicating access restrictions to portions of the document 102. In an alternative embodiment, XML attributes are used for the same purpose. Like the to-be-signed tag 116, the accessible-by tag 120 comprises a beginning tag and an end tag, the text between the tags comprising the portion of the document 102 that is access restricted. Preferably, the parser 106 is used to identify the access-restricted portions of the document 102.

In one embodiment, the accessible-by tag 120 includes an indication of one or more roles, access levels, or the like, of individuals who may view and/or modify the document 102. For example, an accessible-by tag 120 has the following format in one embodiment:

<AccessibleBy>

<ViewModify><PersInfo Role="Judge"></ViewModify>

<View><PersInfo Role="Plaintiff"></View>

. . .

</AccessibleBy>

In this example, the judge may both view and modify the document 102, while the plaintiff may only view the document 102. Preferably, all other individuals would not be able to view or modify the document.

If, in step 312, it is determined that the document includes access restrictions, the method continues with step 314 by preventing unauthorized access to the access-restricted portions, such as by masking the display of, and/or preventing modifications to, those portions. For example, in one embodiment, the, foreground color of textual portions that the signer is not entitled to view is set to the same color as the background. As a result, the signer will perceive a "blank" portion of the document 102 when it is displayed. In alternative embodiments, a graphical box or the like is superimposed over the access-restricted text, making the text unreadable.

In addition, any number of conventional locking mechanisms may be employed to prevent modifications to document data. For example, text fields may be marked with "read only" attributes, and text entry fields, pull down menus, and radio buttons may be "grayed out" to prevent modifications to the document 102 using techniques well known to those skilled in the art.

In more secure embodiments, one or more masked portion may be encrypted using the public key of the person authorized to access those portions. As a result, if the signer is the authorized party, only she may use her private key to decrypt and display the masked portions.

Figure 4D:
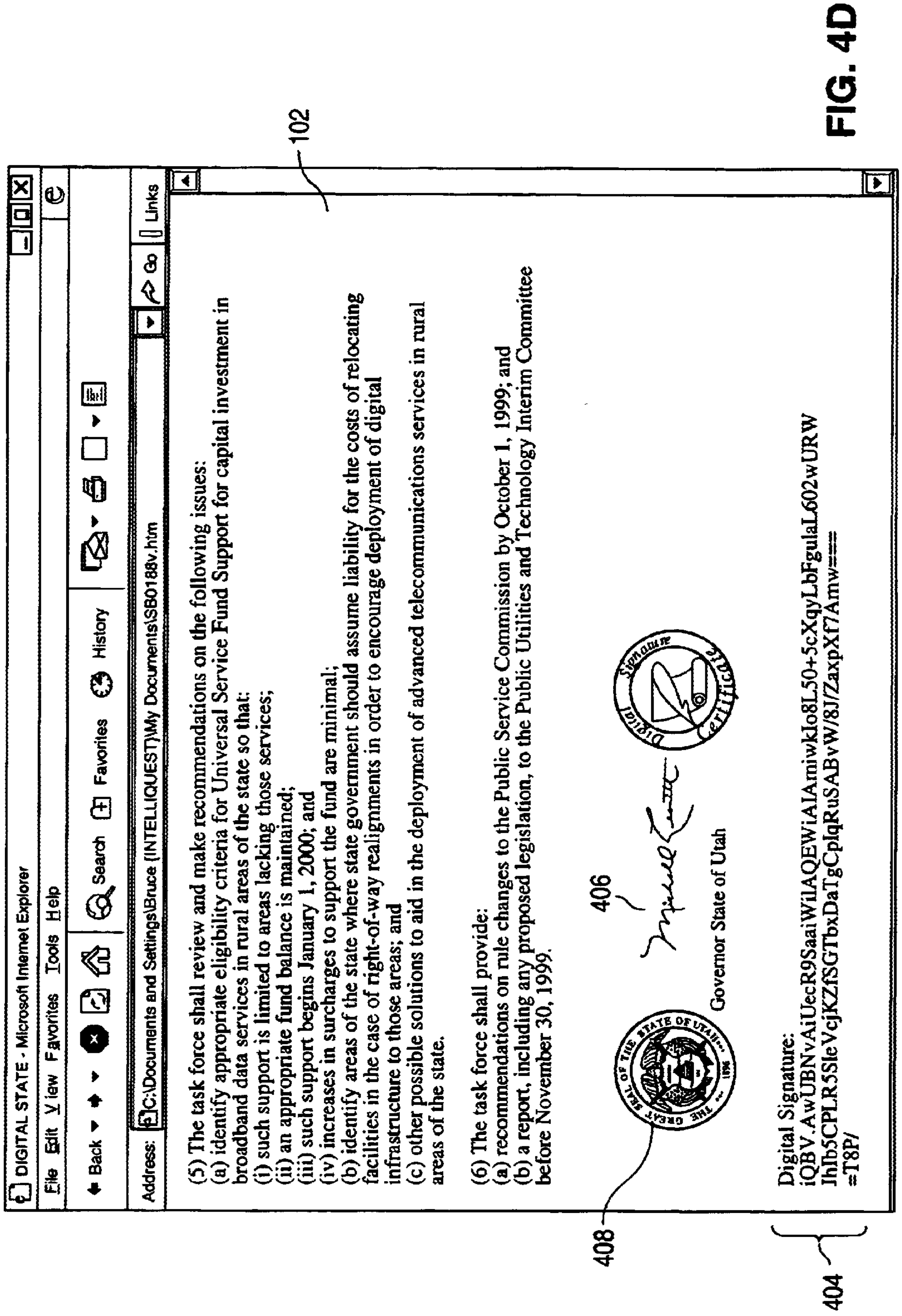

After either steps 312 or 314, the method continues by displaying 316 the document 102, excluding any masked portions, to the signer, and accepting any edits, or modifications, to the portions accessible to the signer. This allows the signer to review the document 102 and make any required selections or changes before applying her digital signature 118. Preferably, as illustrated in FIG. 4D, a Web browser is used to display and/or edit the XML-encoded document 102 using conventicinal techniques.

After the document 102 is displayed and edited, the method continues by receiving 318 from the signer an indication to sign the document 102. This may be accomplished in a variety of ways, none of which are crucial to the present invention. For example, the signer may use the input device 210 to click on a "sign now" button or the like.

Next, the method continues by storing 320 in to-be-signed portion of the document 102 the date and time at which the document 102 is signed. Preferably, the current date and time is read from a system clock (not shown) or the like, which is coupled to the CPU 202. The inclusion of a time and date stamp is important for auditing purposes, and may be crucial in later court or administrative proceedings in determining the validity and applicability of the signed document 102. In conventional systems, digitally-signed documents do not include time and date stamps for individually-signed portions of the documents 102, and thus cannot realistically model documents 102 that are signed at differentdates and times by different individuals.

In one embodiment, date and time tags are added to the to-be-signed portion, identifying the date and time at which the document 102 is signed by the signer. For example, the date and time tags have following format in one embodiment:

<date>01-02-1999</date>

<time>15:43:16.12</time>

By adding the date and time tags to the to-be-signed portion, the tags will be digitally signed, making it impossible for the signer to later repudiate the date and time of the digital signature.

After the date and time are stored, the method continues by calculating a message digest for the to-be-signed portion of the document 102. As noted above, this is accomplished in one embodiment using a one-way hash function, such as SHA or MD5, whereby any change to the message will result in a different calculated message digest. Those skilled in the art will recognize that a variety of other hash functions could be used without departing from the spirit of the invention.

Thereafter, the method continues by encrypting 322 the message digest using the signer's private key to generate the signer's digital signature 118. While it is possible to encrypt the whole document 102, it is typically not necessary because many documents are non-private except for specific portions that may be masked as described above. Moreover, encrypting a document using public key cryptography is approximately 1000 times slower than using a symmetric key approach, such as DES. Thus, for time and resource concerns, it is advantageous to minimize the amount of data encrypted.

After the digital signature 118 is created, the method continues by storing the digital signature 118 within the document 102. In one embodiment, the digital signature 118 is stored directly after the to-be-signed portion, although those skilled in the art will recognize that the signature 118 could be stored at other locations.

In one embodiment, the document 102 includes a signing history portion for storing the digital signature 118 of each signer of the document 102. The signing history portion may be separately designated by an XML tag, such as <Signatures></Signatures>, and forms a convenient location in which to look to determine which signers have signed the document 102.

After the digital signature 118 is stored, the method continues by obtaining 328 and storing the signer's digital certificate. A digital certificate is an attachment to a document 102 that is used to provide additional verification that the signer is who he or she claims to be. An individual wishing to digitally sign a document applies for a digital certificate from a Certificate Authority (CA), such as Verisign, Inc., of Mountain View, Calif. The CA issues an encrypted digital certificate containing the applicant's public key and a variety of, other identification information. The CA makes its own public key readily available through print publicity or perhaps on the Internet. Thus, the recipient of an encrypted message uses the CA's public key to decode the digital certificate attached to the document 102, verifies it is issued by the CA, and then obtains the sender's public key and identification information held within the certificate. The recipient may then be assured that the signer is who he or she claims to be. Preferably, the ANSI X.509 standard is used for digital certificates.

In one embodiment, the signer's digital certificate is obtained from the signer's smartcard, as discussed above with respect to the smartcard embodiment. In alternative embodiments, the certificate may be obtained from a database after the signer is authenticated with a pass phrase or the like. The digital certificate is preferably stored in the document 102 near the associated digital signature 118. In one embodiment, the digital certificate may be identified in the document 102 by the <Cert></Cert> tag.

Figure 4E:
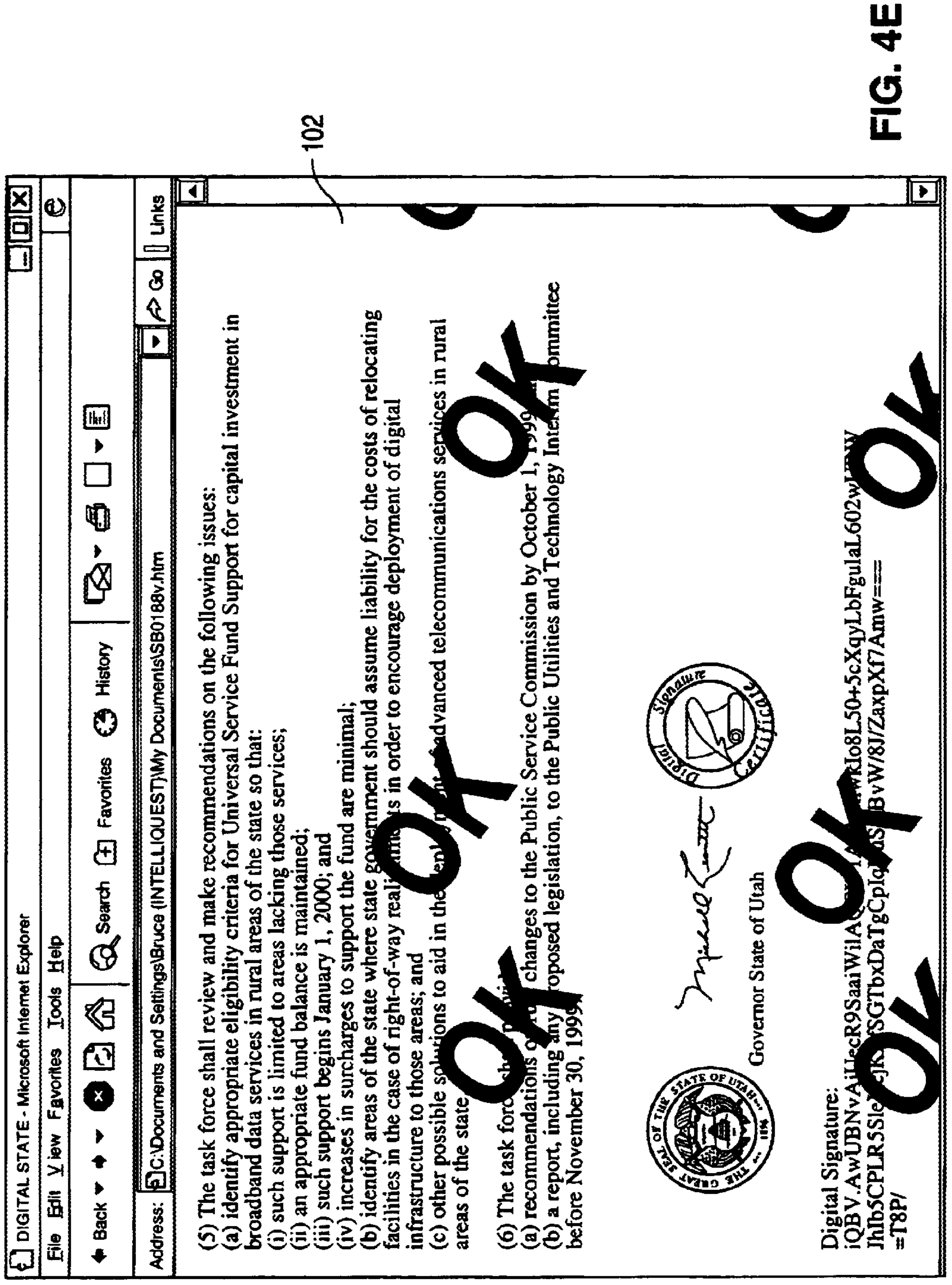

After the digital certificate is stored, the method continues by displaying 328 a visual indication of the signer's digital signature 118 in conjunction with the display of the document 102. A variety of technique may be employed. For example, as shown in FIG. 4D, a digitized version of the signer's handwritten signature 406 may be applied to the document 102. Likewise, in appropriate situations, a graphical seal 408 could be displayed. This may be particularly appropriate, for example, in the case of a "digital notary", who may perform a similar function as a notary public by verifying a signer's digital signature and digital certificate with a CA. Moreover, an ASCII representation 410 of the digital signature 118 could also be displayed. FIG. 4E illustrates yet another visual indication of the signer's digital signature 118 in the form of a graphical overlay of the word "OK". After the visual indication is displayed, the method is complete.

Referring now to FIG. 5, there is shown an alternative embodiment of the present invention in the form of a system 500 for processing electronic documents 102. In one embodiment, the document processing system 500 includes a plurality of document processing stations 502. Preferably, each processing station 502 is coupled to a network 504, such as the Internet or another packet-switched network, whereby each station 502 can send and receive documents 102 to and from the other stations 502. In one embodiment, the system 500 also includes a processing service name server 506, the operation of which is described hereafter.

Referring now to FIG. 6, there is shown a functional block diagram of the details of a document processing station 502. As described above, each document 102 is preferably encoded using a markup language, such as the extensible markup language (XML), although the invention is not limited in that respect. As before, the document 102 could represent any of a number of legal or commercial instruments, such as sales contracts, licenses, non-disclosure agreements, patent applications, court pleadings, mortgages, and the like.

In one embodiment, each document 102 includes at least one data portion 602 and at least one processing portion 604. Each data portion 602 includes marked up data, including one or more to-be-signed tags 116 and accessible-by tags 120, as described above with reference to FIG. 2. Each processing portion 604 includes, one or more processing instructions 606. As described in greater detail below, the processing instructions control the processing of the document 102 by the station 502. Thus, the disclosed document processing system 500 is "document-driven", rather than being directed by hard-coded instructions within a client or server computer.

Briefly, the principal components of the station 502 include a parser 106, at least one processing service 600, and a signing module 108. Preferably, the foregoing components are implemented as software modules running on a conventional personal computer, such as an IBM PC™ compatible, although other implementations are possible. Although the components are described herein as separate functional units, those skilled in the art will recognize that various components may be combined or integrated into a single software application or device.

The parser 106 parses the document 102 to identify various sub-elements contained therein, such as the data portion 602, the processing portion 604, the processing instructions 602, the to-be-signed tags 116, and the accessible-by tags 120. In addition, the parser 106 is used in one embodiment to identify at least one processing service 600 for executing each processing instruction 600.

A variety of processing services 600 may be provided by each processing station 502. For example, as shown in FIG. 7, the services 600 may include a document signing service 702, a document creation service 704, a signer notification service 706, a database interaction service 708, a signature verification service 710, and a payment processing service 712. The signing service 702 is essentially identical to the document signing system 100, described above. The various other services 600 will be described below in greater detail.

Referring again to FIG. 6, after the document 102 is processed, the signing module 108 applies the digital signature 118 of the document processing station 502 to the entire document 102. In a preferred embodiment, each processing station 502 has a unique private key for applying a digital signature 118. This is advantageous because it prevents tampering with the document 102 during transmission and may additionally be used for auditing purposes.

FIG. 7 is a physical block diagram showing the components used to implement the functionality of FIG. 6. For purposes of clarity, the components that are unchanged from FIG. 2 retain their original reference numbers and will not be described in further detail. In this embodiment, however, the addressable memory 212 includes additional components, such as the document signing service 702, the document creation service 704, the signer notification service 706, the database interaction service 708, the signature verification service 710, and the payment processing service 712.

Referring now to FIG. 8A, there is shown a flowchart of a method 800 for processing electronic documents 102 according to an embodiment of the present invention. The method begins by receiving 802 a document 102 at a processing station 502. The document 102 is preferably received from the network 504, but in alternative embodiments, the document 102 could be received from other sources, such as the storage device 204, the input device 210, the smartcard reader 211, or the like.

In the case of the network 504, the document 102 is preferably received using a standard protocol, such as the Hypertext Transfer Protocol (HTTP), the Simple Mail Transfer Protocol (SMTP), or the File Transfer Protocol (FTP). Preferably, all transmissions over the network 504 additionally employ a security protocol, such as the Secure Multipurpose Internet Mail Extension (S/MIME) or the Secure Sockets Layer (SSL).

After the document 102 is received, the method continues by reading 804 a processing instruction 606 from the processing portion 604 of the document 102. As explained above, the parser 106 is used in one embodiment to identify the sub-elements of the document 102 corresponding to the processing portion 604 and read the processing instructions 606 contained therein.

After the processing instruction 606 is read, the method continues by identifying a processing service 600 for executing the processing instruction 606. As explained above, a number of processing services 600 may be provided, such as the document signing service 702, the document creation service 704, the signer notification service 706, the database interaction service 708, the signature verification service 710, and the payment processing service 712. In one embodiment, each processing instruction 606 has a name that corresponds to one of the processing services 600. Thus, the parser 106 uses name of the processing instruction 606 to identify the corresponding processing service 600.

A determination 808 is then made whether the identified processing service 600 is available within the processing station 502 currently hosting the document 102. In one embodiment, various processing stations 502 provide different, specialized services in the context of the overall document processing system 500. For example, some processing stations 502 may be specially adapted to facilitate document signing, such as those comprising smartcard readers 211, display devices 208, and the like. Other processing stations 502 may be adapted to update a database, notify a signer, process payments, and the like.

Additionally, in some cases, more than one station 502 may include the same service 600, such as the document signing service 702, but are adapted for use by a certain individual. For example, a judge may have a processing station 502 in his chambers for reviewing and digitally signing electronically-filed court documents 102. Thus, if a document 102 to be signed by the judge is currently hosted by a different station 502, the document 102 is preferably sent to the judge's station 502, as described in greater detail below.

If the identified processing service 600 is available within the processing station 502, the method continues by executing 810 the processing instruction 606 by the identified processing service 600. A more detailed discussion of this step is provided with respect to FIGS. 8B.

If, however, the identified processing service 600 is not available within the processing station 502, the method continues by identifying 812 a processing station 502 within the document processing system 500 in which the identified processing service 600 is available. This step may be accomplished in a number of ways.

For example, in one embodiment, each processing station 502 maintains a list of services 600 provided by the other processing stations 502 in the document processing system 500. Preferably, the list includes an Internet Protocol (IP) address for each processing station 502 and the services 600 provided by that station 502. Thus, when a processing instruction 606 requires a service 600 that is not available within the station 502 currently hosting the document 102, the IP address is obtained of the station 502 to which the document 102 should be sent.

In an alternative embodiment, each processing station 502 is adapted to communicate with the processing service name server 506 illustrated in FIG. 5. The name server 506 is similar to a Domain Name Server (DNS) in that it resolves the names of services 600 into stations 502 in which those services 600 are available. The name server 506 maintains its own database of services and IP addresses. Thus, when a processing instruction 606 requires a service 600 that is not available within the station 502 currently hosting the document 102, the host station 502 transmits the name of the service 600 to the name server 506, which responds with the IP address of the station 502 to which the document 102 should be sent.

In yet another alternative embodiment, there is no step of identifying a processing station 502. Instead, the document 102 is simply forwarded to a pre-determined processing station 502, such as the next processing station 502 in a chain, ring, or other topological arrangement of processing stations 502 within the document processing system 500.

After the processing station 502 is identified, the method continues by sending 814 the document 102 to the identified station 502 using one or more of the protocols discussed above. Thereafter, the processing instruction 606 is executed 810 using the identified processing service 600.

After the processing instruction 606 is executed, the method continues by applying 816 the digital signature of the processing station 502 to the entire document 102. As noted earlier, each station 502 preferably has a unique private key for creating a digital signature 118. Signing the document 102 by the station 502 provides a means for tracking the document 102 within the system 500 and prevents tampering with the document 102 during transmission. In alternative embodiments, the document 102 is not signed after each processing instruction 660, but only before the document 102 is sent to another processing station 502. In yet another embodiment, the document 102 is signed by the processing station 502 only when directed to do so by a processing instruction 606.

The signing process is essentially the same as described in steps 320 through 326 above, wherein the document 102 is time and date stamped, and a message digest is calculated for the entire document 102 using a one-way hash function. After the message digest is calculated, the message digest is encrypted with the private key of the processing station 502 to create the digital signature 118, which is then stored within the document 102.

After the document 102 is digitally signed, the method continues by determining 818 whether additional instructions 606 within the processing portion 604 need to be executed. If so, the method returns to step 804 to read the next processing instruction 606; otherwise, the method is complete.

Referring now to FIG. 8B, there is shown a flowchart of a method 810 for executing a processing instruction 606 according to one embodiment of the invention. As explained above, each service 600 corresponds to a processing instruction 606, such as a document signing instruction, a document creation instruction, a signer notification instruction, a database interaction instruction, a signature verification instruction, and a payment processing instruction, respectively.

Accordingly, a series of checks 820–825 are made as to the type of the processing instruction 606, and the corresponding processing service 600 is executed. The document signing service 702 is essentially identical to the signing system 100 described above with respect to FIGS. 1–3. The document creation service 704 is described below in greater detail with respect to FIG. 8C. The signer notification service 706 is described below in greater detail with respect to FIG. 8D. The database interaction service 708 is described below in greater detail with respect to FIG. 8E. The signature verification service 710 is described below in greater detail with respect to FIG. 8F. Finally, the payment processing service 712 is described below in greater detail with respect to FIG. 8G.

A first service 600 that may be provided by a processing station 502 is the document signing service 702. The signing service 702 is essentially identical to the system 100 for signing electronic documents 102, as described above with reference to FIGS. 1–3. Consequently, the signing service 702 preferably includes the role identifier 104 and the authenticator 110. Moreover, FIG. 3 is a flowchart of the steps performed by the document signing service 702 when a document signing instruction is executed.

In one embodiment, the document signing instruction specifies the role and/or identity of a person to sign the document 102, which is received by the signing service 702 in step 302 of FIG. 3. For example, a document signing instruction has the following format in one embodiment:

<Step id=2>Sign Document<PersInfo Role="Judge"></Step>

The foregoing instruction directs the signing service 702 to obtain the digital signature 118 of a person in the role of "Judge". It should be recognized, however, that a variety of instruction formats could be used within the scope of the invention.

In an alternative embodiment, the instruction may not specify a role, in which case a default role for the processing station 502 is used. In another embodiment, the instruction does not specify a role, and the processing station 502 queries a user for a role as described in step 302 of FIG. 3. In yet another embodiment, the signing instruction may identify a processing station 502 to which the document 102 should be sent to obtain a digital signature 118, in which case the document 102 is transmitted to the identified station 502 during step 814 of FIG. 8A.

A second service 600 that may be provided by a processing station 502 is the document creation service 702. An advantage of the invention over conventional systems is the ability of one document 102 to initiate the creation of one or more additional documents 102. As described below, the document creation service 702 retrieves a document template corresponding to a specified document type and copies specified portions of the initial document 102 into the new document 102. Thus, there is no need for a file clerk to re-enter data into the new document 102, saving considerable time and effort while increasing accuracy.

The document creation service 704 is desirable in many applications and contexts. For example, the document 102 illustrated in Appendix B is an "information", which used in some jurisdictions to charge a person with a crime. After the judge signs the information,a document creation instruction within the document 102 may initiate the creation of an "arrest warrant", with all of the relevant details from the information being copied into the arrest warrant. Like the information, the new arrest warrant preferably includes a set of processing instructions 606 for directing the processing of the warrant within the system 500.

FIG. 8C is a flowchart of a method 830 performed by the document creation service 704 according to one embodiment of the invention. The method begins by identifying 832 the document type of the new document 102 to be created. The document type preferably refers to the format (i.e. XML tags), organization, and purpose of a given document 102. In one embodiment, each document type corresponds to a document template that is stored, for example, in the storage device 204. In alternative embodiments, however, the document template could be stored at a different processing station 502, or at a dedicated server, such as the name server 506.

In one embodiment, the document creation instruction specifies the document type of the document 102 to be created. The following is an example of a document creation instruction according to one embodiment:

<Step id=13>Create Document <Type="Arrest Warrant">

<Copy=Caption><Copy=Offense>

</Step>

In the foregoing example, the document creation instruction initiates the creation of an arrest warrant and copies the "caption" and "offense" portions from the information into the arrest warrant.

After the document type is received, the method continues by retrieving 834 the corresponding document template from the storage device 204 or other storage location and generating 836 a new document 102 from the document template. In one embodiment, the generation process may simply involve making a copy of the template. Alternatively, the generation process may additionally include adding a variety of elements to the template, including tags, time and date stamps, formatting instructions, digital signatures, and the like.

After the new document 102 is created, the method continues by copying 838 at least a subset of the data from the initial document 102 into the new document 102. In the document creation instruction illustrated above, a "copy+ attribute is used to indicate the portions to be transferred. The "caption" and "offense" values correspond to tagged portions within both the initial and new documents 102. Thus, after the copying step is completed, the new document 102 includes the same data in its "caption" and "offense" portions as the initial document 102.

After the data is copied, the method continues by processing 800 the new document 102 according to the steps illustrated in FIG. 8A. In a preferred embodiment, the operating system 214 illustrated in FIG. 2 supports multitasking, such that each new document 102 is handled by a new process or thread within the processing station 502. Thus, each processing system 502 may process a plurality of documents 102 at the same time.

A third service 600 that may be provided by a processing station 502 is the signer notification service 706. The purpose of the signer notification service 706 is to notify the signer concerning documents that need to be signed, as well as remind the signer to sign if he or she has not done so by a specified time. It should be recognized that the signer notification service 702 could also be used to send notification messages to individuals other than a signer. For example, in the context of an electronic court filing system, a notification could be sent to a district attorney when a judge or magistrate has not signed an information within the allotted time. Additionally, in an alternative embodiment, the notification service 702 could be used for synchronizing document processing between a plurality of processing stations 502.

FIG. 8D is a flowchart of a method 840 performed by the signer notification service 706 according to one embodiment of the invention. The method begins by identifying 842 the recipient of the notification. In one embodiment, the signer notification instruction includes an identification of the recipient by role, e-mail address, or the like. In addition, the instruction may specify a message to be sent to the recipient, as well as a reminder time (and date) for reminding the recipient to sign the document. For example, a signer notification instruction has the following format in one embodiment:

<Step id=6>Notify

<PersInfo Role="Judge">

<Message>Please sign arrest warrant.</Message>

<Reminder><Date>01-02-1999</Date>

<Time>12:00:00.00</Time></Reminder>

</Step>

In one embodiment, only the recipient's role is specified, which is resolved into an e-mail address or the like using conventional techniques. In an alternative embodiment, the e-mail address or processing station 502 of the signer is directly specified in the signer notification instruction.

After the recipient is identified, the method continues by sending 844 a notification message to the recipient. In one embodiment, the notification message is an e-mail message, and the notification service 706 includes, or is coupled with, a standard e-mail server, such as the Exchange Server, available from Microsoft Corporation. In alternative embodiments, other notification systems could be used. For example, a custom-designed notification client may be provided at each processing station 502. The notification service 706 may communicate with each notification client using a standard protocol, such as the User Datagram Protocol (UDP). When a UDP notification packet is received at a notification client, the client may provide any of a number of visual or audible notifications to the recipient, such as a chime, pop-up dialog box, blinking icon, or the like. In still another embodiment, the reminder message could be a recorded voice message that is sent via a telephone voice messaging system.

After the notification message is sent, a check 846 is made whether a reminder time is specified within the signer notification instruction. If not, the method is complete. If, however, a reminder time is specified, the method continues by waiting 847 until the specified time, after which a check 848 is made whether the recipient has signed the document 848. If the recipient has signed, indicated by the recipient's digital signature 118 being found within an appropriate location in the document 102, the method is complete. If, however, the recipient has not signed, the method continues by sending 849 a reminder message to the recipient.

In one embodiment, the reminder message is sent using the same method the notification message, although a different method could be used within the scope of the invention. Additionally, in an alternative embodiment, the notification message is not sent, but the reminder message is sent upon reaching the reminder time. This has the effect of delaying notification to the recipient until a desired time.

A fourth service 600 that may be provided by a processing station 502 is the database interaction service 708. In a preferred embodiment, the database interaction service 708 facilitates export and import of document data to and from a Database Management System (DBMS). Any DBMS may be used within the scope of the present invention, such as Oracle8i available from Oracle Corporation of Redwood Shores, Calif. In a preferred embodiment, however, the DBMS should support the Structured Query Language (SQL).

The database interaction service 708 preferably accesses the DBMS using Open DataBase Connectivity (ODBC) calls. ODBC a standard database access method developed by Microsoft Corporation which makes it possible to access any data from any application, regardless of which DBMS is handling the data. This is accomplished by inserting an ODBC-compliant database driver between an application and the DBMS for translating the application's data queries into commands that the DBMS can process.

The ability to transfer data between a document 102 and a DBMS is advantageous in many respects. For example, in the context of an electronic court filing system, the database interaction service 708 may be used to automatically update a court docketing system whenever a document 102 is received, signed, or otherwise processed by a processing station 502. As a result, the database interaction service 708 eliminates the need for a filing clerk to manually enter such data, saving time and effort and increasing accuracy.

FIG. 8E is a flowchart of a method 850 performed by the database interaction service 708 according to one embodiment of the invention. The method begins by identifying 852 the DBMS with which to interact, as well as the data to be transferred. Preferably, these elements are directly identified within the database interaction instruction. For example, a database interaction instruction has the following format in one embodiment:

<Step id=4>Interact<DBMS>CORIS</DBMS>

<Import="SELECT*FROM CHARGES WHERE DOI=2432", CHARGE>

<Export=CAPTION>

</Step>

In the foregoing example; the database interaction instruction identifies a DBMS called CORIS, which is a database used by the courts in the State of Utah. In addition, the instruction identifies data elements, corresponding to tagged elements within the document 102 for export to, and import from, the DBMS. In one embodiment, the data to be transferred is specified using the "Export" and "Import" attributes. However, those skilled in the art, however, will recognize that the data may be specified in a variety of ways without departing from the spirit of the invention. In alternative embodiments, the DBMS may not be specified, in which case a default DBMS is used.

After the DBMS and to-be-transferred data are identified, a check 854 is made whether a DBMS export attribute is specified. If not, the method continues with step 856. If so, the method continues by exporting 856 the specified data from the document 102 to the DBMS. Generally, only a portion of the document 102 is exported to the DBMS. However, if desired, the entire document 102 may be sent to the DBMS, such as for archival purposes. Preferably, an ODBC-compliant database driver manages the conversion of XML document data into a format suitable for the DBMS.

After either step 854 or step 856, a check 858 is made whether a DBMS import attribute is specified. If not, the method is complete. If so, the method continues by importing 859 the specified data from the DBMS into the document 102. In one embodiment, the database interaction instruction specifies a query, such as a SQL query, as well as a tagged portion of the document 102 to receive the imported data after the query is executed. In the foregoing example, a query, i.e. "SELECT*FROM CHARGES WHERE DOI=2432", is specified, as well as a tagged portion, i.e. "CHARGES", to receive the resulting data. After the data is imported, the method is complete.

A fifth service 600 that may be provided by a processing station 502 is the signature verification service 710. There are numerous instances in which it is advantageous to verify, or authenticate, a digital signature 118. For example, whenever a document 102 is sent from one processing station to another, it is advantageous for the receiving processing station 502 to check the document 102 for, and to verify, the digital signature 118 of the sending processing station 502. First, it confirms that the document 102 was not tampered with during transmission. Second, it confirms that the document 102 was actually sent from the sending processing station 502. In addition, it is advantageous to verify the signatures 118 of individuals who have signed the document 102 in various roles or capacities.

Because the signature verification service 710 preferably relies on a public key infrastructure (PKI), as specified in the ANSI X.509 version 3 standard, the following is a brief discussion of PKI. One of the key difficulties with public key cryptography is that a person can generate a key pair and release his public key to the on-line world, using any identity he chooses, with no guarantee that the identity is authentic. Thus, there is a need for some entity to serve as a trusted third party to vouch for the person's identity, and his relationship to his public key. As described previously, this entity is referred to as a Certification Authority (CA). The CA is a trusted third party that issues digital certificates to its subscribers, binding their identities to the key pairs they use to digitally sign electronic communications. A number of CA's are currently available for providing digital certificates, such as VeriSign, Inc., of Mountain View, Calif.

In general, digital certificates contain the name of the subscriber, the subscriber's public key, the digital signature of the issuing CA, the issuing CA's public key, and other pertinent information about the subscriber and his organization, such as his authority to conduct certain transactions. These certificates are stored in an on-line, publicly accessible repository, and are accessed using a standard protocol, such as the Lightweight Directory Access Protocol (LDAP). As noted earlier, these certificates are preferably stored in the document 102 near the associated digital signature 118. The repository also maintains an up-to-date listing of all the unexpired certificates which have been revoked, referred to as a Certificate Revocation List (CRL).

FIG. 8F is a flowchart of a method 860 performed by the signature verification service 710 according to one embodiment of the invention. The method begins by identifying 862 the signature 118 to be verified. In one embodiment, the signature 118 is identified within the signature verification instruction by a specification of a role. For example, a signature verification instruction has the following format according to one embodiment:

<Step id=1>Verify Signatures

<PersInfo Role="Judge"></Step>

In the foregoing example, the signature verification service 710 is instructed to verify the digital signature 118 corresponding to the role of "Judge." In an alternative embodiment, the signature verification instruction does not indicate a specific signature, in which case the service 710 may verify a default signature 118, such as the signature 118 of the last processing station 510 to process the document 102. Alternatively, the service 710 may verify all of the signatures 118 contained within the document 102.

After the signature 118 is identified, the method continues by decrypting 864 the signer's digital certificate using the public key of the issuing CA. As noted above, each digital signature 118 is associated, in one embodiment, with a certificate. The certificate is preferably encrypted using the private key of the CA. Therefore, the published public key of the CA may be used to decrypt the certificate.

Typically, the certificate includes at least the signer's name and public key. Therefore, after the certificate is decrypted, the method continues by determining 866 whether the signer's identity, as indicated by the role/identity within the document 102, matches the signer's name in the decrypted certificate. If not, the signature verification service 710 terminates with the signature 118 not being verified.

If, however, the signer's identity and matches the name in the certificate, a check 868 is made whether the certificate has been revoked. As noted above, the CA maintains an up-to-date listing of all the unexpired certificates which have been revoked in a Certificate Revocation List (CRL). Thus, the signature verification service 710 checks the CRL for the signer's certificate. In alternative embodiments, other techniques may be used to determine the revocation status of a certificate, such as by using the Online Certificate Status Protocol (OCSP).

If, in step 868, it is determined that the certificate has been revoked, the signature verification service 710 terminates with the signature 118 not being verified. If, however, the certificate has not been revoked, the method continues by retrieving 870 the signer's public key from the certificate. Thereafter, the signer's public key is used to decrypt 872 the digital signature 118 to obtain the old message digest, i.e. the message digest calculated by the message digest calculator 112 when the digital signature 118 was initially created.

After the old message digest is obtained, the method continues by recalculating 874 a new message digest of the signed portion using the message digest calculator 112. Thereafter, the old and new message digests are compared 876. If the digests are different, the signature verification service 710 terminates with the signature 118 not being verified. If, however, the digests match, the service 710 terminates with the signature 118 being verified.

A sixth service 600 that may be provided by a processing station 502 is the payment processing service 712. In many instances, it is advantageous to charge a fee for processing an electronic document 102. For example, a fee could be charged whenever a document 102 is filed in an electronic court filing system.

Thus, in one embodiment, the payment processing service 712 checks a document 102 for an electronic payment request, authorizes the request based on the authority of the signer, and completes the electronic payment. A significant advantage over conventional electronic payment systems is that the electronic payment request is authorized by a digital signature 118, making the request non-repudiatable.

Preferably, the payment processing service 712 is capable of handling a variety of electronic payment transactions, such as, for example, Electronic Funds Transfer (EFT), Automated Clearing House (ACH), and credit card transactions. In one embodiment, the payment processing service 712 uses the Commerce Site Server, available from Microsoft Corporation, to process electronic transactions, although variety of other systems could be used which are well known to those skilled in the art.

In one embodiment, the payment processing service 712 supports the Open Financial Exchange (OFX), which is a unified specification for the electronic exchange of financial data between financial institutions, business and consumers via the Internet. Created by CheckFree, Intuit and Microsoft in early 1997, OFX supports a wide range of financial activities including consumer and small business banking; consumer and small business bill payment; and bill presentment and investments, including stocks, bonds and mutual funds.

FIG. 8G is a flowchart of a method 890 performed by the payment processing service 712 according to one embodiment of the invention. The method begins by identifying 882 an electronic payment request within the document 102. Preferably, an electronic payment request is a tagged portion of the document 102 indicating (1) the amount of the payment and (2) either (a) the signer's credit card number or (b) a source and a destination bank account number (including bank routing numbers if required). The following is an example of an electronic payment request in XML:

<Payment>

<Amount>$75.00</Amount>.

<Method><CC=4121741409290411><EXP=12-1999></Method>

</Payment>

In one embodiment, a document 102 may include a single electronic payment request, in which case the payment processing instruction may have a simplified format:

<Step id=14><ProcessPayment></Step>

In alternative embodiments, a document 102 may include a plurality of electronic payment requests, in which case the payment processing instruction may specify a particular payment by indicating the individual who signed the portion of the document 102 containing the request:

<Step id=14><ProcessPayment>

<PersInfo Role="Plaintiff"></Step>

In the foregoing example, the payment processing service 712 would search the document 102 for the electronic payment request contained within the portion signed by the Plaintiff. In alternative embodiments, the payment processing instruction may specify that all of the electronic payment requests within the document 102 are to be processed.

After the electronic payment request is identified, the method continues by verifying 860 the digital signature 118 of the individual who signed the electronic payment request. Preferably, only signed payment requests are processed. In one embodiment, the verification process is accomplished using the method 860 illustrated in FIG. 8F. Thereafter, a determination 884 is made whether the signature was successfully verified. If the signature was not successfully verified, the method continues at step 890.

If, however, the signature was successfully verified, the method continues by checking 886 the digital certificate corresponding to the signature 118 for the maximum signing authority of the signer. Under X.509 version 3, the digital certificate may specify a maximum signing authority. For example, a signer may only be authorized to digitally sign payment requests up to $1000.00. Thus, the digital certificate of the signer will indicate a maximum signing authority of $1000.00.

A determination 888 is then made whether the amount of the electronic payment request is authorized, i.e. the payment amount does not exceed the signer's maximum signing authority. If not, the method continues with step 890 by processing the authorization failure. In one embodiment, an authorization failure may simply result in the payment request being ignored, in which case the signer may be billed for the deficiency. However, in alternative embodiments, the signer and/or the signer's employer, bank, or the like, will be notified of the authorization failure.

If, however, the amount is authorized, the method continues by completing 892 the electronic transaction using one of the techniques discussed above. For example, the credit card or bank account information is retrieved from the electronic payment request and is processed by the payment processing service 712, after which the method is complete.

Based on the foregoing description, it is evident that the present invention offers numerous advantages not found in prior systems. For example, the use of to-be-signed tags 116 allows various portions of an XML document 102 to be signed by different individuals, unlike conventional systems which are limited to the signing of an entire document by a single individual. Moreover, the use of accessible-by tags 116 selectively permits various individuals view and/or modify portions of a digitally-signed document 102, unlike conventional systems in which a document 102 must be viewed or modified in its entirety or not at all.

In addition, the present invention offers a flexible, efficient, and auditable system and method for processing electronic documents 102. Initially, the present invention is flexible. Because the system 500 is document-driven, it does not require a high degree of compatibility and uniformity among the processing stations 502. Indeed, each processing stations 502 need only have an XML parser 106 to parse the document 102 and at least one service 600 to execute a processing instruction 106. Thus, the processing stations 502 may be built on a wide variety of computing platforms.

Moreover, the present invention is efficient. Unlike conventional systems that employ a file clerk or EDI processor, resulting in double-coding of information, the present invention is capable of automatically interacting with a DBMS to import and export document data. Moreover, a document according to the claimed invention can spawn additional documents, automatically copy relevant data from the initial document into the new document, thus avoiding the need for a filing clerk.

Finally, the present invention is auditable. Each digital signature 118 in the document 102 is time and date stamped and includes a digital certificate for verification purposes. The signature 118 may either be stored near the to-be-signed portion or in a special signing history portion. In either case, the document includes an internal audit trail that may be used for a variety of purposes.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention.

APPENDIX A

The following is an example of an XML document type definition (DTD) for a document 102 in the context of a electronic court filing system. Those skilled in the art, however, will recognize that the DTD may be adapted to numerous specific applications and contexts.

```
<!SGML "ISO 8879:1986"
--SGML Declaration and Document Type Definition for Court Documents--
Copyright 1999 iLumin
--
Module: COURT.dtd
--
        APPINFO      NONE>
<!--The document type definition for a COURT begins here:-->
<!DOCTYPE COURT [
<!--The following "parameter entities" group elements together so that
 hereafter they can be referred to by a single, collective name.-->
<!--These presentation emphasis elements can be within any other element
 of the document, but no other element can be a subelement within them,
 with the exception of other emphasis elements.-->
<!ENTITY % Emph    "Bold|Undln|Italic">
<!--This contains notes or in-text references to notes.-->
<!ENTITY % NNRef    "NoteRef|Note">
<!--Elements for title and headings-->
<!ENTITY % Rubrics "Title|Heading1|Heading2|Heading3|Heading4">
<!--Elements that can contain ANY AND ALL OTHER
 ELEMENTS are NOT included: Para, Table. Names of persons and the CaseNum
 are also not included.-->
<!ENTITY % OthRegs "Request|BlQuote|Graphic|BullItem|CalEvent|CalDate
        |CalTime|PlRef|DefRef">
<!ENTITY % CrData "ProsGov|Offense|OffLabel|OffDesc|OffLevel|OffAuth|Inchoate
        |PenEnh|RepChar|VioDate|VioLoc|OTN|CitNum|SSN|DOB|Alias
        |Sex|Race|Marks|Lang|DrivNum|DrivSt|LEA|Badge|ArrDate
        |BkNum|OldCNum|LEARef">
<!ELEMENT COURT    (TBsigned+ & Sig+)>
<!ELEMENT TBSigned    (#PCDATA|PersInfo|PIRef|Caption|Table|Para|OtherUCD
        |DataTab|Cite|Fee|%CrData;|%OthRegs;|%Rubrics;|%NNRef;
        |%Emph;)*         --content to be signed-->
<!ATTLIST TBSigned SigID IDREF #REQUIRED>
<!ELEMENT Sig      (#PCDATA)        --the digitai signature-->
<!ATTLIST Sig    PID    IDREF #REQUIRED
                 SiqID ID    #REQUIRED>
<!ELEMENT PersInfo (#PCDATA|Given|Middle|Last|BusGov|BarNum|Email|Address
|City|State|Zip|Phone|FAX|DOB|DistName|CertNum|AKA|FKA
|NKA|DBA|%Emph;|%NNRef;|OTN|SSN|Sex|Race|Marks|Lang
|DrivNum|DrivSt|ArrDate|BkNum|Badge|CitNum) *
```

APPENDIX A-continued

```
<!ATTLIST PersInfo Role (Adoptee|Apellant|Apellee|BondSurety|ClassRep|CtClerk
                     |CtReporter|Custodian|Decedent|Defendant|Filer|Gardian
                     |Garnishee|Garnishor|Intervenor|Judge|Master|Mediator
                     |Notary|Officer|Protected|Plaintiff |Sheriff |TPDefendant
                     |TPPlantiff|Petitioner|PersonalRep|Respondent
                     |PeaceOfficer|Inheritor|Witness) #REQUIRED
                     PID     ID                #REQUIRED>
<!ELEMENT Given      (#PCDATA|%NNRef;|%Emph)* --given name-->
<!ATTLIST Given      privacy (public|private|confidential|sealed) "public">
<!ELEMENT Middle     (#PCDATA|%NNRef;|%Emph)* --middle name-->
<!ATTLIST Middle     privacy (public|private|confidential|sealed) "public">
<!ELEMENT Last       (#PCDATA|%NNRef;|%Emph)* --last name of an individual-->
<!ATTLIST Last       privacy (public|private|confidential|sealed) "public">
<!ELEMENT BusGov     (#PCDATA|%NNRef;|%Emph)* --business/gov't name-->
<!ATTLIST BusGov     privacy (public|private|confidential|sealed) "public">
<!ELEMENT BarNum     (#PCDATA)       --Bar number-->
<!ATTLIST BarNum     privacy (public|private|confidential|sealed) "private">
<!ELEMENT Email      (#PCDATA|%NNRef;|%Emph)* --email address-->
<!ATTLIST Email      privacy (public|private|confidential|sealed) "private">
<!ELEMENT Address    (#PCDATA|%NNRef;|%Emph)* --street address-->
<!ATTLIST Address    privacy (public|private|confidential|sealed) "private">
<!ELEMENT City       (#PCDATA|%NNRef;|%Emph)* --city-->
<!ATTLIST City       privacy (public|private|confidential sealed) "private">
<!ELEMENT State      (#PCDATA|%NNRef;|%Emph)* --state-->
<!ATTLIST State      privacy (public|private|confidential|sealed) "public">
<!ELEMENT Zip        (#PCDATA)       --zip code-->
<!ATTLIST Zip        privacy (public|private|confidential|sealed) "private">
<!ELEMENT Phone      (#PCDATA|%NNRef;|%Emph)* --phone number-->
<!ATTLIST Phone      privacy (public|private|confidential|sealed) "private">
<!ELEMENT FAX        (#PCDATA|%NNRef;|%Emph)* --FAX phone number-->
<!ATTLIST FAX        privacy (public|private|confidential|sealed) "private">
<!ELEMENT DOB        (#PCDATA)       --date of birth-->
<!ATTLIST DODB       privacy (public|private|confidential|sealed) "private">
<!ELEMENT Distname   (#PCDATA)       --distinguished name-->
<!ATTLIST Distname   privacy (public|private|confidential|sealed) "public">
<!ELEMENT CertNum    (#PCDATA)       --certificate number-->
<!ATTLIST CertNum    privacy (public|private|confidential|sealed) "public">
<!ELEMENT AKA        (#PCDATA|Given|Last|BusGov|%Emph;|%NNRef)*>
<!ATTLIST AKA        privacy (public|private|confidential|sealed) "public">
<!ELEMNNT FKA        (#PCDATA|Given|Last|BusGov|%Emph;|%NNRef)*>
<!ATTLIST FKA        privacy (public|private|confidential|sealed) "public">
<!ELEMNNT NKA        (#PCDATA|Given|Last|BusGov|%Emph;|%NNRef) *>
<!ATTLIST NKA        privacy (public|private|confidential|sealed) "public">
<!ELEMENT DBA        (#PCDATA|Given|Last|BusGov|%Emph;|%NNRef)*>
<!ATTLIST DBA        privacy (public|private|confidential|sealed) "public">
<!ELEMENT SSN        (#PCDATA)       --social security number-->
<!ATTLIST SSN        privacy (public|private|confidential|sealed) "private">
<!ELEMENT Alias      (#PCDATA)       --alias-->
<!ATTLIST Alias      privacy (public|private|confidential|sealed) "public">
<!ELEMENT Sex        (#PCDATA)       --sex-->
<!ATTLIST Sex        privacy (public|private|confidential|sealed) "public">
<!ELEMENT Race       (#PCDATA)       --race-->
<!ATTLIST Race       privacy (public|private|confidential|sealed) "private">
<!ELEMENT Marks      (#PCDATA)       --body marks-->
<!ATTLIST Marks      privacy (public|private|confidential|sealed) "private">
<!ELEMENT Lang       (#PCDATA)       --language-->
<!ATTLIST Lang       privacy (public|private|confidential|sealed) "private">
<!ELEMENT CitNum     (#PCDATA)       --citation number, if any-->
<!ATTLIST CitNum     privacy (public|private|confidential|sealed) "public">
<!ELEMENT DrivNum    (#PCDATA)       --driver's license number-->
<!ATTLIST DrivNum    privacy (public|private|confidential|sealed) "private">
<!ELEMENT DrivSt     (#PCDATA)       --state issuing driver's license-->
<!ATTLIST DrivSt     privacy (public|private|confidential|sealed) "private">
<!ELEMENT ArrDate    (#PCDATA)       --date of arrest-->
<!ATTLIST ArrDate    privacy (public|private|confidential|sealed) "public">
<!ELEMENT BkNum      (#PCDATA)       --jail's booking number-->
<!ATTLIST BkNum      privacy (public|private|confidential|sealed) "public">
<!ELEMENT PIRef      (#PCDATA|Given|Middle|Last|BusGov|BarNum|Email|Address
|City|State|Zip|Phone|FAX|DOB|DistName|CertNum|AKA|FKA
|NKA|DBA|%Emph;|%NNRef;|OTN|SSN|Sex|Race|Marks|Lang
|DrivNum|DrivSt|ArrDate|BkNum|Badge|CitNum) *
                                     --refer to a PersInfo in the doc-->
<!ATTLIST PIRef      PID   IDREF   #REQUIRED>
<!ELEMENT Caption    (#PCDATA|CtName|PersInfo|CaseNum|Title|Plref|DefRef
                     |%CrData;|%Emph) *>
<!ELEMENT CtName    (#PCDATA|%NNRef;|%Emph)*                          --court name-->
<!ELEMENT CaseNum   (#PCDATA|%NNRef;|%Emph)*                          --case number-->
<!ATTLIST CaseNum   PID   IDREF   #IMPLIED>
<!ELEMENT Title     (#PCDATA|%NNRef;|%Emph;|Cite|OtherUCD)*           --title of doc-->
```

APPENDIX A-continued

```
<!ELEMENT Heading1   (#PCDATA|Cite|%NNRef;|%EmPh)*                          --1st level-->
<!ELEMENT Heading2   (#PCDATA|Cite|%NNRef;|%Emph)*                          --2nd level-->
<!ELEMENT Heading3   (#PCDATA|Cite|%NNRef;|%Emph)*                          --3rd level-->
<!ELEMENT Heading4   (#PCDATA|Cite|%NNRef;|%Emph)*                          --4th level-->
<!ELEMENT Para       (#PCDATA|Table|Cite|%CrData;|%OthRegs;|%NNRef;|%Emph) *
                     --Paragraph-->
<!ELEMENT BlQuote    (#PCDATA|Para|Cite|%NNRef;|%Emph)*                     --block quote-->
<!ELEMENT Table      (#PCDATA|Cite|Reguest|%NNRef;|%Emph;|Graphic) *>
<!ATTLIST Table      LI    NUMBER    #IMPLIED                               --left indentation--
                     RI    NUMBER    #IMPLIED                               --right indentation--
                     TABS    CDATA    #IMPLIED>
<!ELEMENT DataTab    (#PCDATA|%CrData;|%OthRegs;|PersInfo|PIRef|%NNRef;
                     |%Emph)*                                               --not displayed by default-->
<!ELEMENT BullItem   (#PCDATA|Cite|%NNRef;|%Emph;)*                         --item in bulleted list-->
<!ELEMENT Bold       (#PCDATA|Undln|Italic)*                                --bold type-->
<!ELEMENT Undln      (#PCDATA|Bold|Italic) *                                --underlined-->
<!ELEMENT Italic     (#PCDATA|Bold|Undln)*                                  --italicized-->
<!ELEMENT Graphic    EMPTY>
<!ATTLIST Graphic    File CDATA #REQUIRED>
<!ELEMENT NoteRef    (#PCDATA|Cite|%Emph)*                                  --reference to note in main text-->
<!ATTLIST NoteRef    NoteLink IDREF #REQUIRED>
<!ELEMENT Note       (#PCDATA|Para|Table|BlQuote|Cite|%Emph) *
                                                                            --content of note-->
<!ATTLIST Note       NoteLink ID          #REQUIRED>
<!ELEMENT Cite       (#PCDATA|%NNRef;|%Emph)*                               --citation-->
<!ELEMENT OtherUCD   (#PCDATA|%NNRef;|%Emph)*                               --citation to other UCD-->
<!ATTLIST OtherUCD   CaseNum    NUMBER    #IMPLIED
                     SerNum    CDATA    #REQUIRED>
<!ELEMENT CalEvent   (#PCDATA|%Emph)*                                       --Calendared event-->
<!ELEMENT CalDate    (#PCDATA|%Emph)*                                       --Calendared date-->
<!ELEMENT CalTime    (#PCDATA|%Emph)*                                       --Calendared time-->
<!ELEMENT Fee        EMPTY>
<!ATTLIST Fee        Amount    NUMBER    #REQUIRED
                     Account    CDATA    #REQUIRED
                     Expires    CDATA    #IMPLIED>
<!ELEMENT PlRef      (#PCDATA)                                              --plaintiff's reference number-->
<!ELEMENT DefRef     (#PCDATA)                                              --defendant's reference number-->
<!--The Request element marks text asking the court to do something,
  e.g. issue an arrest warrant (the result).
  "To" attribute is where to send the result.-->
<!ELEMENT Request    (#PCDATA|%Emph;|%NNRef;)*>
!ATTLIST Request Result  (ArrWarr|SrchWarr|WritGar|WritExec|WritAtch|OSC
                     |Judgement|Decision)       #REQUIRED
                     DefLoc          (Jail|Known|Unknown|BookdRel|Prison) Unknown
                     EMail           CDATA        #IMPLIED
                     BailRec         NUMBER       #IMPLIED
                     PID             IDREF        #IMPLIED>
<!ELEMENT Offense    (#PCDATA|OffLabel|OffDesc|OffLevel|OffAuth|Inchoate
                     |PenEnh|RepChar|VioDate|VioLoc) *>
<!ATTLIST Offense    PID IDREF #IMPLIED>
<!ELEMENT OffLabel   (#PCDATA)                                              --Offense label from reference outline-->
<!ATTLIST OffLabel   Version NUMBER #IMPLIED>
<!ELEMENT OffDesc    (#PCDATA|%NNRef;|%Emph)*                               --offense in English-->
<!ELEMENT OffLevel   (#PCDATA|%NNRef;|%Emph)*                               --severity, 1st degree felony-->
<!ELEMENT OffAuth    (#PCDATA|%NNRef;|%Emph)*
                                                                            --authority criminalizing the offense-->
<!ELEMENT Inchoate   (#PCDATA|%NNRef;|%Emph)*                               --Attempt* or conspir*-->
<!ELEMENT PenEnh     (#PCDATA|%NNRef;|%Emph)*                               --penalty enhancement(s)-->
<!ELEMENT RepChar    (#PCDATA|%NNRef;|%Emph)*                               --reported characteristics-->
<!ELEMENT VioDate    (#PCDATA|%NNRef;|%Emph)*                               --violation date-->
<!ELEMENT VioLoc     (#PCDATA|%NNRef;|%Emph)*                               --violation location-->
<!ELEMENT ProsGov    (#PCDATA|PersInfo|BusGov|%NNRef;|%Emph)*>
<!ELEMENT OTN        (#PCDATA)                                              --offense tracking number-->
<!ELEMENT LEA        (#PCDATA)                                              --law enforcement agency-->
<!ELEMENT Badge      (#PCDATA)                                              --arresting officer's badge #-->
<!ELEMENT OldCNum    (#PCDATA)                                              --case # of prior related case-->
<!ELEMENT LEARef     (#PCDATA)                                              --LEA's reference number-->
]>
```

APPENDLX B

The following is an example of an XML-encoded document 102 in the context of a electronic court filing system. Those skilled in the art, however, will recognize that the document may be adapted to numerous specific applications and contexts.

```
<UCDBCR>
```

APPENDLX B-continued

<TBSigned SigID="Magistrate">
<TBsigned SigID="FILER">
DAVID E. YOCOM
District Attorney for Salt Lake County
<PersInfo Role=Filer PID=ISRAELSEN1><Given>BRENT</Given> <Last>ISRAELSEN</Last>,
<BarNum>8311</BarNum>
Acting Deputy District Attorney
231 East 400 South, Suite 300
Salt Lake City, Utah 84111
Telephone: (801) 363-7900
E-Mail: <Email>Brent@iLumin.com</Email></PersInfo>
<Caption>
IN THE <CtName>THIRD DISTRICT COURT, SALT LAKE DEPARTMENT IN AND FOR SALT LAKE COUNTY, STATE OF UTAH</CtName>
THE <PersInfo Role=Plaintiff PID=Utah><BusGov>STATE OF UTAH</BusGov></PersInfo>,
Plaintiff,
v.
<PersInfo Role=Defendant PID=BROWN2><Given>BRUCE</Given> <Last>BROWN</Last>,
AKA: <AKA><Last>B.</Last> <Given>Dr.</Given></AKA>
DOB: <DOB>2/1/52</DOB>
OTN: <OTN>222</OTN>
Defendant</PersInfo>
BAIL: $100,000.00
</Caption>
<Title>Information</Title>
<para>The undersigned LANE D. WARD - SL Police, under oath, states on information and belief that the defendant committed the crimes of:
<Offense><OffDesc>BEING A FUGITIVE FROM JUSTICE</OffDesc>, in <VioLoc>Salt Lake County</VioLoc>on or about <VioDate>April 1, 1999</VioDate>, in violation of <OffAuth>Title 77, Chapter 30, Section 13, Utah Code Annotated 1953, as amended</OffAuth><OffLabel>77-30-13</OffLabel>, in that the defendant, BRUCE BORWN, was then and there a fugitive from justice from the State of Utah, the defendant having been duly charged in the City of St. George, County of Washington, State of Utah, with the crime of stupidity and failure to yeild, on or about March 30, 1999, the same having been filed in a Court having proper jurisdiction, and a warrant having been duly issued for the arrest of said BRUCE BROWN having fled from the State of UTAH after the commission of the offense charged to the Sait Lake County, State of Utah.
<Heading1>THIS INFORMATION IS BASED ON EVIDENCE OBTAINED FROM THE FOLLOWING WITNESSES:</>
PATTI BROWN and EMILY REYNOLDS
<TBSigned SigID="AFFIANT">
<Heading1>PROBABLE CAUSE STATEMENT:</>
<para>Affiant received a communication from St. George Police of Washington County, State of Utah, stating that St. George Police holds a warrant for the arrest of BRUCE BROWN for stupidity and failure to yeild and produced a description of said BRUCE BROWN. BRUCE BROWN who fit that description was iocated in Sait Lake County, Utah on April 1, 1999, by LANE D. WARD, SL Police. </para>
</TBSigned>
<Sig PID=WARD3 sigID="AFFIANT">
-----BEGIN PGP MESSAGE-----
Version: 2.6.2
iQB1AwUANy4kxKgi96n0KrSzAQGSywL/Xr7PhJApcFMRFfvOv5O2T7YVeBATBHH/
CRJXmYNA6Z2gqjDbT4jzg00b6hZ/k386/6GdFDKOEL6AVKyjEUxJM3It7Fyo46P1
05bHuguo6Iwtvlx6M87331aky5FaVOy/
=5fkg
-----END PGP MESSAGE-----
</Sig>
<Cert PID=WARD3>
-----BEGIN PGP PUBLIC KEY BLOCK-----
Version: 2.6.2
mQBtAzWiiLkAAAEDAMby1MkJgOVDKh7XDfzYMYBGuAP9FvaPOGAZpfi5B9ipAnRM
Dg8o/pMfuE+AxcY6afGggwq4iOKePPq8+nKAhqwHf8xSkvzFIEwgItRw7zjvleH
EL1huC2oIvep9Cq0swAFEbQNQnJ1Y2UgPEJydWN1PokAdQMFEDWiiLmoIvep9Cq0
swEBU14DAIUFKtn/2DqXOdfOk9BHLBtd8NMgeEABFLYA+i0Y+oor3MklbAXKeSjs
12NGIrO446KdtW4IRa25gfEy3+RwuS4nuqvtSwLapk7G7aaLanmh12eHTjLQ8vfw
cZQB5CW10g==
=jQd0
-----END PGP PUBLIC KEY BLOCK-----
</Cert>
<DataTab>
<Bold><Undln>Data Table for Initial Criminal Filing</Undln></Bold>
<Undln>Case-Specific Information</Undln>:

| | |
|---|---|
| Prosecuting govemmental entity: | <ProsGov>SALT LAKE COUNTY</ProsGov> |
| Prior related cases: | |
| S.L. County Attorney's case number: | <PlRef>7878</PlRef> |
| Law Enforcement Agency: | <LEA>SL Police</LEA> |
| Law Enforcement Agency's Number: | :<LEARef>432</LEARef> |

APPENDLX B-continued

| | |
|---|---|
| Arresting Officer: | <PersInfo Role=officer PID=WARD3> |
| <Given>LANE D.</Given><Last>WARD</Last> | |
| Officer's Badge No.: | <Badge>333</Badge></PersInfo> |

What is claimed is:

1. A computer-implemented method for digitally signing an electronic document by a plurality of signers, each signer having a signing role and a unique private key for applying a digital signature, each signing role corresponding to a to-be-signed portion of the document, at least two signing roles corresponding to different to-be-signed portions, the method comprising:

determining the signing role of each signer;

identifying the to-be-signed portion of the document corresponding to the signing role of each signer;

receiving an indication from each signer to digitally sign the document; and applying the digital signature of each signer to the corresponding to-be-signed portion in response to the indication from each signer, wherein the document comprises at least one delimiter for indicating the to-be-signed portion of the document corresponding to the signing role of a signer, the identifying step comprising:

locating within the document the at least on delimiter corresponding to the signing role of the signer; and using the at least one delimiter to identify the to-be-signed portion of the document corresponding to the signing role of the signer.

2. The method of claim 1, wherein the delimiter is selected from the group consisting of the extensible markup language (XML) tag and an XML attribute.

3. A computer-implemented method for digitally signing an electronic document by a plurality of signers, each signer having a signing role and a unique private key for applying a digital signature, each signing role corresponding to a to-be-signed portion of the document, at least two signing roles corresponding to different to-be-signed portions, the method comprising:

determining the signing role of each signer;

identifying the to-be-signed portion of the document corresponding to the signing role of each signer;

receiving an indication from each signer to digitally sign the document; and applying the digital signature of each signer to the corresponding to-be-signed portion in response to the indication from each signer, wherein the applying step comprises: storing within the corresponding to-be-signed portion a date in which the to-be-signed portion is digitally signed by each signer.

4. A computer-implemented method for digitally signing an electronic document by a plurality of signers, each signer having a signing role and a unique private key for applying a digital signature, each signing role corresponding to a to-be-signed portion of the document, at least two signing roles corresponding to different to-be-signed portions, the method comprising:

determining the signing role of each signer;

identifying the to-be-signed portion of the document corresponding to the signing role of each signer;

receiving an indication from each signer to digitally sign the document; and applying the digital signature of each signer to the corresponding to-be-signed portion in response to the indication from each signer, wherein the applying step comprises: storing within the corresponding to-be-signed portion a time in which the to-be-signed portion is digitally signed by each signer.

5. A computer-implemented method for digitally signing an electronic document by a plurality of signers, each signer having a signing role and a unique private key for applying a digital signature, each signing role corresponding to a to-be-signed portion of the document, at least two signing roles corresponding to different to-be-signed portions, the method comprising:

determining the signing role of each signer;

identifying the to-be-signed portion of the document corresponding to the signing role of each signer;

receiving an indication from each signer to digitally sign the document; and applying the digital signature of each signer to the corresponding to-be-signed portion in response to the indication from each signer, wherein the applying step comprises:

calculating a message digest for the corresponding to-be-signed portion;

encrypting the message digest using the signer's private key; and storing the encrypted message digest in the document as the signer's digital signature.

6. The method of claim 5, wherein the applying step further comprises:

storing with the digital signature a corresponding digital certificate, the digital certificate issued by a certificate authority and authenticating the digital signature of the signer.

7. The method of claim 5, wherein calculating a message digest comprises applying a one-way hash function to the to-be-signed portion of the document.

8. A computer-implemented method for digitally signing an electronic document by a plurality of signers, each signer having a signing role and a unique private key for applying a digital signature, each signing role corresponding to a to-be-signed portion of the document, at least two signing roles corresponding to different to-be-signed portions, the method comprising:

determining the signing role of each signer;

identifying the to-be-signed portion of the document corresponding to the signing role of each signer;

receiving an indication from each signer to digitally sign the document; and applying the digital signature of each signer to the corresponding to-be-signed portion in response to the indication from each signer, further comprising:

prior to the receiving step, obtaining from the signer at least one proposed edit to the to-be-signed portion of the document.

9. The method of claim 8, wherein the document includes at least one delimiter for indicating an access-restricted portion of the document, the access-restricted portion for editing by only selected signers, the obtaining step comprising:

locating within the document the at least one delimiter;

using the at least one delimiter to identify the access-restricted portion;

determining whether the signer is among the selected signers by whom the access-restricted portion may be edited; and applying the proposed edit to the access-restricted portion when the signer is among the selected signers.

10. A computer-implemented method for digitally signing an electronic document by a plurality of signers, each signer having a signing role and a unique private key for applying a digital signature, each signing role corresponding to a to-be-signed portion of the document, the document including a signing order for indicating an order in which the document is to be signed by the plurality of signers, the method comprising:

determining a signing role of a signer;

determining whether the signer is signing in the indicated order;

when the signer is signing in the indicated order:

identifying the to-be-signed portion of the document corresponding to the role of the signer;

receiving an indication from the signer to digitally sign the document; and applying the digital signature of the signer to the corresponding to-be-signed portion.

11. The method of claim 10, wherein the signing order comprises an ordered sequence of signing roles.

12. A computer-implemented method for digitally signing an electronic document by a plurality of signers, each signer having a signing role and a unique private key for applying a digital signature, each signing role corresponding to a to-be-signed portion of the document, at least two signing roles corresponding to different to-be-signed portions, the method comprising:

determining the signing role of each signer;

identifying the to-be-signed portion of the document corresponding to the signing role of each signer;

receiving an indication from each signer to digitally sign the document; and applying the digital signature of each signer to the corresponding to-be-signed portion in response to the indication from each signer, further comprising adding the digital signature to a signing history associated with the document.

* * * * *